US006301770B1

(12) United States Patent
McIlwraith

(10) Patent No.: US 6,301,770 B1
(45) Date of Patent: Oct. 16, 2001

(54) METHOD FOR FORMING LIGHTING SHEET

(75) Inventor: George McIlwraith, Peachtree City, GA (US)

(73) Assignee: NSI Enterprises, Inc., Atlanta, GA (US)

( * ) Notice: Subject to any disclaimer, the term of this patent is extended or adjusted under 35 U.S.C. 154(b) by 0 days.

(21) Appl. No.: 09/598,690

(22) Filed: Jun. 21, 2000

Related U.S. Application Data

(60) Division of application No. 09/037,320, filed on Mar. 6, 1998, now Pat. No. 6,164,800, which is a continuation-in-part of application No. 08/587,584, filed on Jan. 16, 1996, now abandoned.

(51) Int. Cl.[7] ................................ B23P 25/00; F21V 7/22

(52) U.S. Cl. .......................... 29/527.2; 427/162; 427/327; 362/292; 362/342; 359/884

(58) Field of Search ............................ 29/527.7; 427/162, 427/327; 362/292, 342; 359/884

(56) References Cited

U.S. PATENT DOCUMENTS

| | | | | |
|---|---|---|---|---|
| 2,971,083 | * | 2/1961 | Phillips et al. | 362/347 |
| 3,808,421 | * | 4/1974 | Willumsen | 362/342 |
| 4,123,793 | * | 10/1978 | Lilley | 362/350 |
| 4,268,897 | * | 5/1981 | Schierwagen et al. | 362/342 |
| 4,490,184 | * | 12/1984 | Forchy et al. | 359/884 |
| 4,729,075 | * | 3/1988 | Brass | 362/290 |
| 5,251,064 | * | 10/1993 | Tennant et al. | 359/884 |

* cited by examiner

*Primary Examiner*—P. W. Echols
(74) *Attorney, Agent, or Firm*—Kenneth E. Darnell

(57) ABSTRACT

Coated articles having optically useful reflective properties suitable for manufacture of components of lighting fixtures and the like including parabolic louvers utilized as primary elements of fluorescent parabolic troffer lighting fixtures, the invention provides light sheets formed of said coated articles and used in the manufacture of lighting fixtures, the reflective lighting components formed from said light sheets and the coated articles including the coatings utilized for coating optically reflective substrates according to the invention. The coated articles are formed of reflective substrates and particularly polished metal substrates having reflectance values within a predetermined useful range, the substrates being coated preferably with a thin polymeric coating wherein the base polymer is polyester, polycarbonate, epoxy, acrylic, acrylate, etc. The coating particularly provides mechanical properties to the article including wear resistance and environmental protection and further including light transmission and surface reflectance properties as well as enhanced appearance. Substrate materials include aluminum and aluminum alloys as well as steels, plated steels and metalized substrates. The invention further includes novel uses of polymeric coating compositions which are applied to the substrates according to the invention for production of the coated articles of the invention.

7 Claims, 7 Drawing Sheets

METHOD FOR FORMING LIGHTING SHEET

CROSS-REFERENCE TO RELATED APPLICATION

This application is a divisional of U.S. patent application Ser. No. 09/037,320, filed Mar. 6, 1998, now U.S. Pat. No. 6,164,800 which is a continuation-in-part of U.S. patent application Ser. No. 08/587,584, filed Jan. 16, 1996, now abandoned, all by the same inventor and assigned to the same assignee.

BACKGROUND OF THE INVENTION

1. Field of the Invention

The invention relates generally to coated articles having useful optical properties and particularly to reflective coated articles suitable for the manufacture of optically reflective components of lighting fixtures including parabolic louvers and the like.

2. Description of the Prior Art

The reflective surfaces of lighting fixture components have long been the subject of intense study especially for light control in continuing efforts to maximize the efficiency of lighting fixtures, improve the appearance of such fixtures and to reduce costs. Whether the lighting fixture component under consideration is taken to be a downlighting reflector or a reflective louver, a primary factor involved in the performance of the reflective fixture component is the material from which the component is manufactured. A primary example is the family of parabolic luminaires manufactured and marketed by Lithonia Lighting, Inc. of Conyers, Ga. under the registered trademark PARAMAX among other trademarks registered by National Service Industries, Inc. of Atlanta, Ga., of which Lithonia Lighting is a division. Particular lighting fixtures manufactured and marketed by Lithonia Lighting, Inc., include fluorescent parabolic troffers including both recessed and surface-mounted fixtures. The performance of such parabolic lumenaires is owed in large measure to the precise parabolic shape of a louver component typically constructed of reflector-quality aluminum such as anodized aluminum. A louver constructed for use with a parabolic lunenaire is provided with carefully contoured cells in order to achieve uniform light distribution, minimum high-angle brightness, reduced glare and optimum efficiency. Such louvers are shaped in the manner of tangential parabolas for superior light control, available light being concentrated to a greater degree in those photo-metric zones most crucial to comfort and efficiency especially in a task lighting situation. Contoured portions of the lunenaire housing continue the paraboloid shapes of the louver to envelope a fluorescent light source or other suitable light source in a fully reflective cavity.

Louver structures are disclosed in a large number of previously issued United States patents. As an example, U.S. Pat. No. 4,780,800, to Mullins, discloses reflective louvers used in lighting fixtures, the louvers of Mullins having reflective parabolic or other curved surfaces. The structure disclosed by Mullins is essentially exemplary of parabolic louvers and similar reflective lighting fixture components which are very well known in the art. Additionally, Wall, Jr. in U.S. Pat. No. 4,839,778, discloses a louver system which is also exemplary of prior art parabolic lumenaires. Still further disclosure is provided by Caferrer in U.S. Pat. No. 5,008,791, wherein parabolic louvers are disclosed as components of parabolic lumenaires and the like. The principles of parabolic louvers and resulting light distribution effects are detailed in U.S. Pat. No. 2,971,083 to Phillips et al. in this patent, the function of parabolic louvers is set forth in addition to the disclosure of other reflective components of lighting fixtures generally and parabolic lumenaires or parabolic troffers in particular. Lasker, in U.S. Pat. No. 4,907,143, describes a fluorescent troffer having a reflector system, the reflectivity of which is of substantial import in the performance of the troffer described in the patent.

Common practice in the lighting industry has been to form reflective lighting fixture components from materials such as anodized aluminum, it especially being the prior practice to form reflectors per se and louvers among other components from anodized aluminum which is an extremely costly material. In spite of material costs, anodized aluminum has proven to be an effective material for manufacture of reflective lighting components due not only to the optical qualities of the material but also due to the ability to readily form anodized aluminum into those shapes necessary for use as reflective lighting fixture components. The specular nature of anodized aluminum can also result in fixture characteristics which are less desirable than would be optimum. For example, witness marks as well as fingerprints and the like inherent in the manufacture of lighting fixtures using anodized aluminum can cause deficiencies in appearance. Further, anodized aluminum is subject to cracking and crazing at elevated temperatures such as are encountered in automated washing apparatus currently available for the cleaning of louvers after manufacture on an assembly line. Due to the expense of anodized aluminum, a material capable of substituting for anodized aluminum in the manufacture of reflective lighting fixture components would be welcomed in the art even if the only advantage of such a substitute material would be lower cost. However in order to realistically substitute for anodized aluminum, a substitute material would necessarily exhibit desirable optical properties as well as be capable of forming with currently available punching and forming tools used in the manufacture of reflected components previously formed of anodized aluminum and the like. In other words, a material capable of substitution for anodized aluminum in the manufacture of reflective lighting fixture components would require properties essential for ease of manufacture, assembly, installation and even long term maintenance and would be especially welcomed in the industry by improvement in these necessary characteristics when compared to anodized aluminum which is presently the material of choice. The industry would further enthusiastically receive a material having the appearance of an anodized aluminum, low iridescent semi-specular finish. The present invention provides a material particularly useful for the fabrication of reflective lighting fixture components and which enjoys the advantages so enumerated as well as a number of other substantial advantages as will be described in greater detail hereinafter.

The materials referred to herein for-manufacture of reflective lighting fixture components generally comprise coated articles having optically useful reflective properties and which are essentially formed from highly polished substrates which reflect light in a specular manner and which are coated such as with polymeric "clearcoat" coating which acts to combine with the specular surface of the substrate to create a compound reflector which exhibits all three reflective components, i.e., specular, spread and diffuse, to obtain the appearance and optical distribution associated with low iridescent, semi-specular anodized aluminum and wherein the specular reflective component dominates but which has a sufficient diffuse component to provide brighter surface appearance, minimized glare, etc. in the finished lighting fixture having at least certain reflective portions formed of the coated substrates of the invention. It is to be stressed that polymeric "clearcoat" coating materials exist in the art as do coated reflective substrates An example of a polymeric clearcoat is provided in U.S. Pat. No. 5,262,494, to Smith et al and assigned to Morton Coatings, Inc. of Chicago, Ill., the disclosure of this patent being incorporated hereinto by reference. Morton Coatings, Inc, and parent company Morton International, Inc. provide an extensive line of coating materials including clearcoat materials under the trademark MOR-BRITE and other trade designations. Such coatings have particular utility in the manufacture of coated articles formed according to the invention and used for the manufacture of reflective Lighting fixture components. The prior art is also replete with coated reflective materials. As an example, U.S. Pat. No. 3,499,780 to Etherington et al discloses the coating of an aluminum reflector having a specular reflecting surface having a silicate solution applied thereto followed by heating to produce a silicate coating on the specular reflecting aluminum surface. However, the material described by Etherington et al has not proven useful in the manner of the present materials as a substitute for anodized aluminum in the manufacture of reflective lighting fixture components. Coated aluminum reflective articles are also disclosed by Mason in U.S. Pat. No. 2,108,604, this patent providing a durable surface on reflective aluminum by particular cleaning processes followed by anodic oxidation. Cohn, in U.S. Pat. No. 2,729,551, treats an aluminum surface to produce a macroscopically uniform smooth finish in an effort to provide optically useful reflective materials. Ricchezza, in U.S. Pat. No. 3,625,737, provides a protective coating on a reflective aluminum substrate while Korver, in U.S. Pat. No. 3,372,008 also provides a reflector formed of aluminum and having a protective layer formed thereon, These prior art reflective materials do not provide acceptable substitutes for the anodized aluminum currently employed in the manufacture of reflective lighting fixture components such as downlighting reflectors, parabolic louvers, etc.

The coated articles of the present invention find particular utility in the formation of components of lighting fixtures which are intended to have optically useful reflective properties and which can be readily manufactured using available forming tools. The materials comprising the coated articles of the invention provide a number of advantages in finished lighting fixtures including fluorescent troffers and the like due not only to the lower cost of the material relative to presently used anodized aluminum but also due to improvements in appearance and other optical characteristics. Accordingly, the invention provides solution to long-felt needs in the art as will be more fully described hereinafter.

SUMMARY OF THE INVENTION

The invention provides articles of manufacture having optically useful reflective properties, the articles of manufacture being suitable for the fabrication of reflective components of lighting fixtures and the like and particularly including parabolic louvers utilized as primary elements of fluorescent parabolic troffer lighting fixtures. The articles of manufacture of the invention are formed of reflective substrates provided with at least one thin coating particularly comprised of a polymeric clearcoat material selected from a variety of polymeric materials suitable for coating of the substrates to produce a reflective article having substantial advantages when utilized in the fabrication of optically reflective lighting fixture components. A suitable substrate according to :he invention is selected to have a nominal thickness of between 0.018" and 0.0235" with a reasonable, thickness range of between 0.016" and 0.025". The substrate is selected to be a highly specular material having a reflectance which is as great a value as is realistically possible. Such substrates typically comprise highly polished aluminum and aluminum alloys, polished steel, steel plated with tin, post-polished aluminized steel, nickel plated steel, steel coated with a specular silver or aluminum reflective film, steel with vacuum deposited aluminum, aluminum provided with a specular silver or aluminum reflective film, or electroplated metals, polished metals or a plastic substrate such as could be formed of polystyrene or arcylic materials having a vacuum metalized aluminum or silver specular appearance.

A substrate selected according to the invention is caused to exhibit maximum reflectance such as by polishing, electrolytic treatment, chemical brightening or other known process. The various substrates contemplated according to the invention are coated typically as a flat sheet with at least one polymeric coating which can take the form of polyesters, acrylics, acrylates, polycarbonates, fluorocarbons and the like, the coating desirably being a coating such as is known as a "clearcoat" with examples thereof being marketed by Morton International Inc. of Chicago, Ill., under the trademark MOR-BRITE CLEAR and other trademarks. An example of a useful coating includes the coatings described in U.S. Pat. No. 5,262,494, the disclosure of which is incorporated hereinto by reference. U.S. Pat. No. 5,262,494 generally describes a polyester coating. U.S. Pat. No. 4,307,150 describes an acrylic coating which is suitable according to the invention for coating onto the substrates of the invention, the disclosure of this patent being incorporated hereinto by reference. Coatings utilized according to the invention can be selected from essentially all polymer families with key characteristics of suitable coatings being optical transmission level and refractive index. Suitable coatings include those coatings having an optical transmission level of between 85 and 98% with the higher optical transmission levels having the greatest utility coatings having a refractive index as close to 1.0 as possible are also favored, typical refractive indices of coatings useful according to the invention typically being approximately 1.4 to 1.6 with lower values of refractive index being preferred. The coating must also readily adhere to the substrate of choice and be capable of formation on the substrate in thicknesses as aforesaid. Selection of suitable coatings also includes a cost consideration especially in light of the fact that the articles of manufacture according to the invention, that is, the coated substrates of the invention, are intended as low-cost substitute materials in the fabrication of reflective lighting fixture components. Additives to the coatings according to the invention can particularly include TEFLON, a trademark of the DuPont Corporation, the TEFLON material functioning as a lubricant to facilitate forming of the coated substrates of the invention into lighting fixture components such as parabolic louvers and the like. Approximately 0.5 to 1% of a lubricant such as TEFLON is added to coating formulations, the additive also enhancing the appearance of the material and the louver formed therefrom.

The coated substrates of the invention essentially are the result of a general process brought about by application of the coating to create a compound reflection from a specular substrate surface to obtain an appearance similar to that of low iridescent anodized aluminum having a semi-specular finish. The coated substrates so produced to not exhibit a "grain" such as occurs with anodized aluminum and virtually all substrates polished to a high specularity. In essence, the present coated substrates exhibit the same appearance in all directions thereby providing an exceptionally attractive material for fabrication of complex three-dimensional reflective lighting fixture components and particularly parabolic louvers. The coated substrates of the invention when formed into reflective lighting fixture components tend to eliminate objectionable glare while providing more than adequate general illumination levels for a given degree of illumination provided by a given light source in a green lighting fixture, a capability not previously considered possible in the art except through the use of expensive materials such as anodized aluminum.

The coated substrates of the invention when used in the fabrication of reflective lighting fixture components provide a quality distribution of light such as when formed into parabolic louver elements conventionally used as significant structural features of parabolic lumenaires which are often referred to as fluorescent troffers since fluorescent light sources ire commonly used with such lighting fixtures. A parabolic louver configured according to the invention with one of the coated substrates thereof provides a "bat wing" profile on a photometric polar plot of light distributed from a parabolic lumenaire provided with a louver formed according to the invention, this quality distribution of light being produced for a given illumination produced by a given light source of a particular parabolic lumenaire.

Considering again the formation of a parabolic louver from one of the present coated substrates, it is to be seen that a parabolic lunenaire so configured will provide a desired level of maintained footcandles on a work plane. Such a measure relates to the amount of light which is directed to the work plane from a series of parabolic lumenaires mounted in a given matrix such as is standard in the field. The maintained footcandle level is an indication of the amount of light exiting the lighting fixture and the degree of control exerted on the exiting light, that is, the ability to place the light where light is required. A parabolic louver formed according to the invention facilitates control of available light, the material, that is, the coated substrate of the invention, used to form the parabolic louver being capable of providing the maintained footcandle level as aforesaid even with a lower total reflectivity and a corresponding reduction of fixture efficiency level.

A parabolic louver formed of a coated substrate according to the invention also acts to maintain high visual comfort probabilities coupled with a diffuse ceiling appearance. Visual comfort probability levels are an indication of the amount of light exiting a lighting fixture at high angles and varies for different materials. For a given lighting situation, the visual comfort probability level is similar to that level expected for a parabolic louver formed of highly specular anodized material. Accordingly, only a small amount of light is being diffused at the ceiling plane when using the coated substrates of the invention, an even illumination of the cells if the louver being thereby provided by the coated substrate material. Diffuse light such as is traditionally known in the art would exhibit poor visual comfort probabilities similar to that of a lens troffer fixture. The present coated substrate materials therefore are capable of providing a diffuse appearance without a diffuse distribution of light, a characteristic which is a totally unexpected result of the use of the present coated substrate materials for the formation of parabolic louvers.

The diffuse surface appearance of parabolic louvers formed of the coated substrate materials of the invention also act to conceal surface imperfections, the diffuse illumination of louver blades so formed acting to conceal minor marking, scratches and other marks such as witness marks which are typically associated with the assembly and installation process. Illumination of an anodized aluminum surface usually reveals minor scratches which become very evident and to ten require rejection of louver elements formed of anodized aluminum or similar materials.

The present coated substrate materials allow ease of manufacture, assembly, installation and maintenance of reflective lighting fixture components, the coated substrate materials being more forgiving for initial manufacturing and for long term maintenance. The present coated substrate materials are easier to form, reduce tool wear, conceal scratches and fingerprints and enable the ready rehealing of surface scratches or surface imperfections while being easily cleaned. The addition of a lubricant such as TEFLON to the coating formulations acts to reduce friction on punch tools and form tools and minimizes contact marks from the pressure of rolls on roll form equipment. The coated substrate materials of the invention also enable V-section blades such as are common structural elements of parabolic louvers to be formed without stress cracking as often occurs in the formation of such blades from anodized aluminum. The hardness of the coated substrates according to the invention is optimized to resist scratches to the degree possible without sacrifice of formability. Gloss levels in the present coated substrates are reduced to as low a value as possible in order to minimize witness marks, fingerprints, etc., such defects being a major problem in the manufacture of parabolic louvers using anodized aluminum. These defects are particularly difficult to remove in the field without special cleansing solutions and substantial time involved in cleaning, louver configured with the present coated substrates can be thoroughly cleaned in production without exceptional difficulty and does not "craze" from exposure to high temperatures during automated wash cycles. The present coated substrate materials typically withstand 450° F. and are therefor not sensitive to the temperature range of production wish equipment, such equipment being capable of utilization for healing of scratches and other imperfections which may occur on the present substrates. In the field, the present coated substrates can be readily cleaned with simple wiping of fingerprints. On anodized aluminum, a dry wipe usually moves smudges around and often leads to a less attractive appearance than before attempted cleaning.

The coated substrate materials of the invention when formed into reflective lighting fixture components such as parabolic louvers produce a brighter, diffuse ceiling appearance with even cell illumination when compared to parabolic luminaires having louvers formed of anodized aluminum and the like. This appearance and even cell illumination occurs as a result of the primary surface reflection from the outer surface of the coated substrate. This brighter, more even cell illumination facilitates use of tandem, in-line wiring where individual rows of lighting fixtures are utilized for night lights, security lights or for lower illumination levels when desired. The contrast between an illuminated row when compared to a dark row is significant such that the darker row draws little attention, a result which is of importance to an intended appearance of a space so illuminated. The coated substrate materials of the invention further provide uniform illuminated appearance, the surfaces of the coated substrates appearing uniform and consistent at varying viewing angles.

The coated substrates of the invention are particularly economical especially when formed of an aluminum alloy as the substrate material with aluminum alloy #3003 produced by the Aluminum Company of America. This select aluminum alloy can be polished and coated according to the invention at a cost improvement over anodized aluminum and the like which significantly reduces the cost of a lighting fixture so configured.

Accordingly, it is an object of the invention to provide a coated substrate material having optically useful reflective properties and which are suitable for manufacture of reflective lighting fixture components such as parabolic louvers and the like and which is characterized by low cost, ease of maintenance, ease of manufacture, surface illumination and brightness, and quality semi-specular photo-metric distribution of light while providing an exceptionally attractive appearance.

It is another object of the present invention to provide a light sheet material formed by one of the coated substrate materials of the invention, the light sheet being preferably in the form of a coil coated according to the invention through the use of coil coating technology such as in a high speed coil-coating facility, thereby producing precision finish characteristics which are uniform in color, gloss, texture and film thickness in individual production runs and from one production run to the next.

It is a further object of the invention to provide coated substrates formed of polished base substrates of relatively high specularity and which are coated to convert the surface appearance of the substrate to a very low iridescent semi-specular appearance, thereby creating a surface for a parabolic louver or the like which is readily formed and field maintained while providing desirable light control and maintained footcandle levels on a work plane.

Further objects and advantages of the invention will become more readily apparent in light of the following detailed description of the preferred embodiments.

DESCRIPTION OF THE PREFERRED EMBODIMENTS

Figure 1:
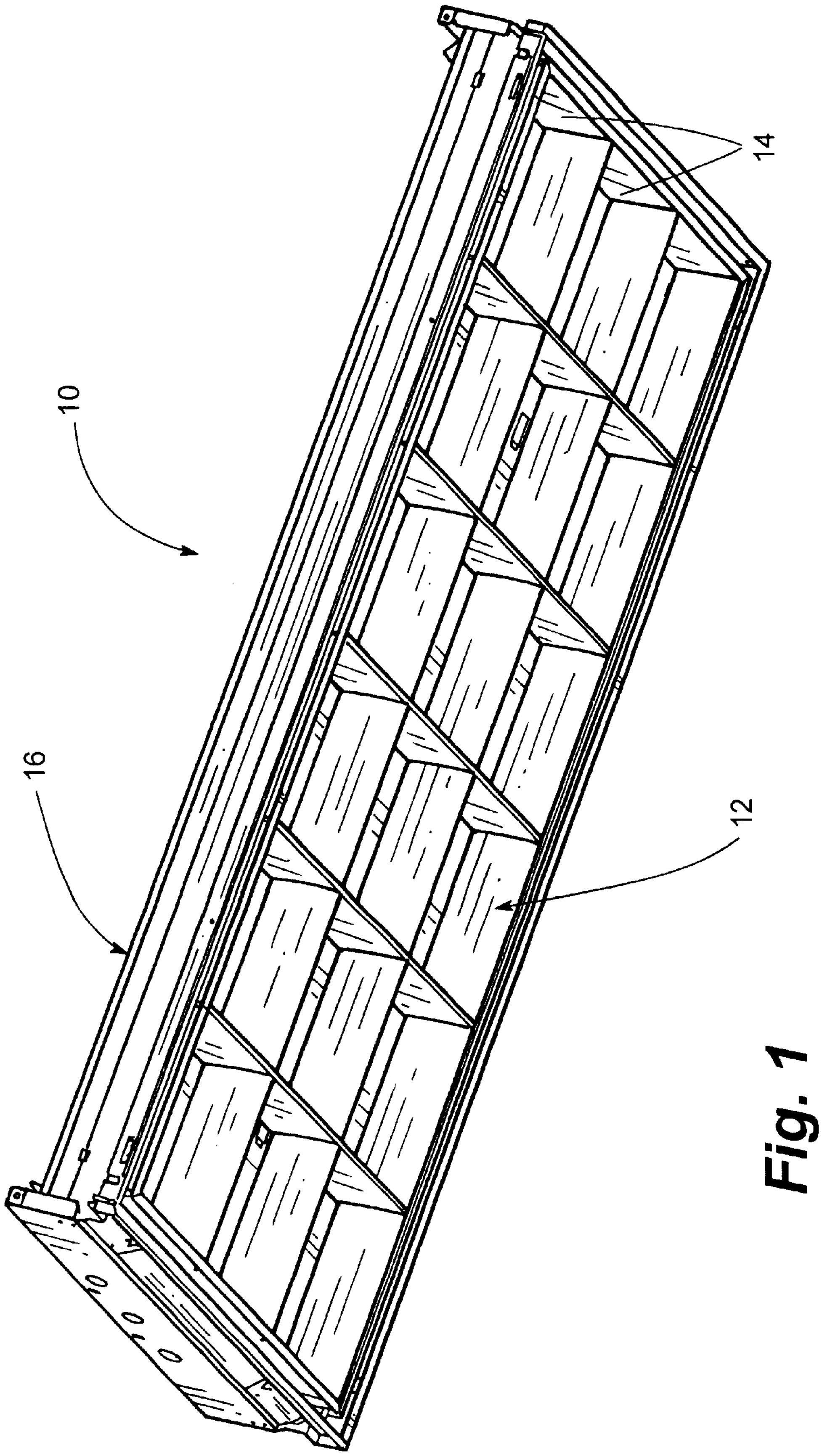
FIG.1 is a perspective view of a fluorescent lighting fixture and particularly a fluorescent parabolic troffer having a parabolic louver.
Figure 2:
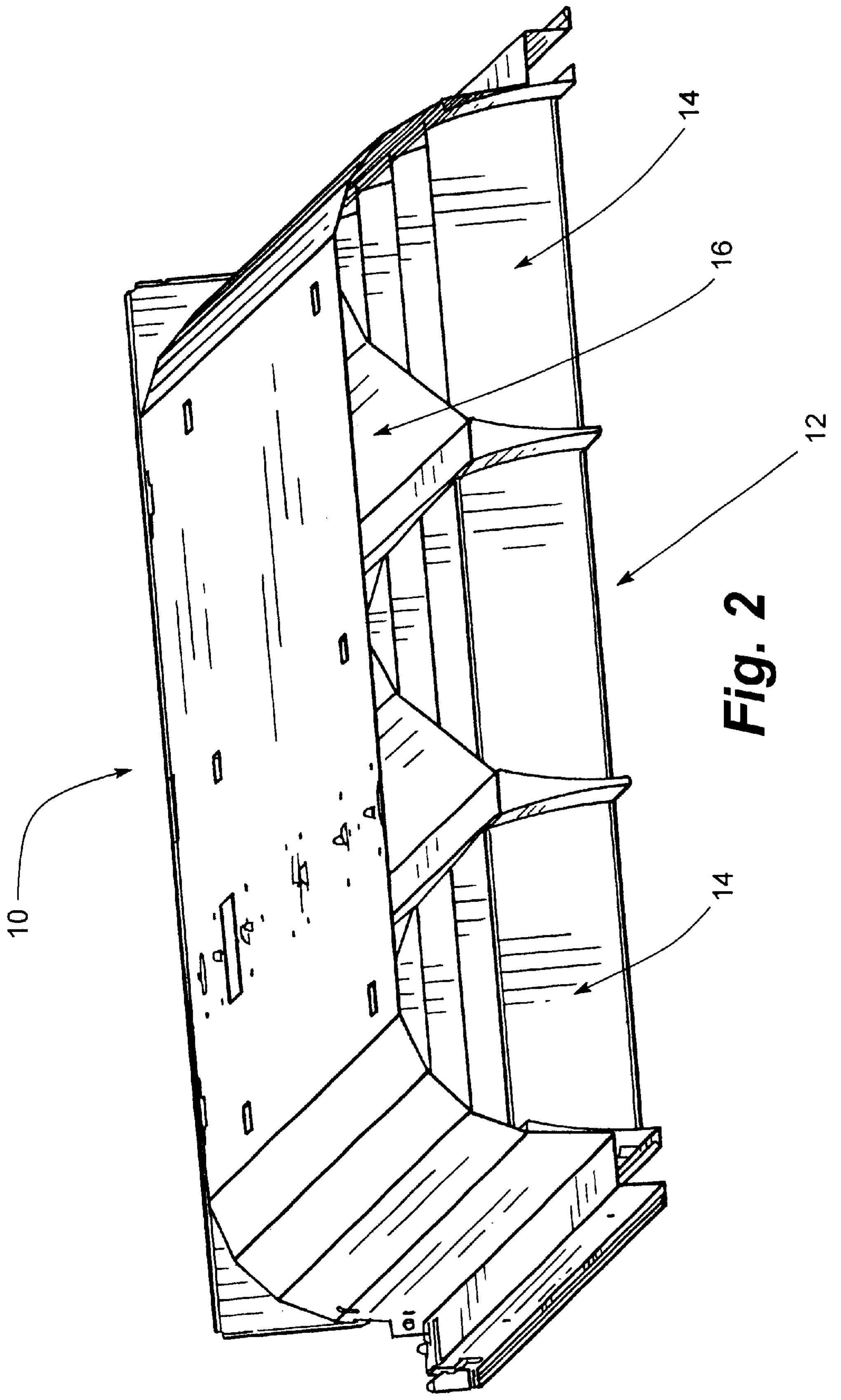
FIG. 2 is a detailed perspective view of a portion of a lighting fixture as is seen in FIG. 1 and illustrating in greater detail portions of the louver and fixture.

Referring now to the drawings and particularly to FIGS. 1 and 2, a parabolic lunenaire as seen at 10 to comprise a parabolic louver 12 formed into cells 14 and mounted to lunenaire housing 16. The lunenaire 10 as shown is configured in the manner of a fluorescent parabolic troffer such as is manufactured and sold by Lithonia Lighting, Inc. of Conyers, Ga., a division of National Service Industries, Inc. of Atlanta, Ga., under the trademark PARAMAX. Lithonia Lighting manufactures and markets other parabolic lighting fixtures under other trademark designations. Parabolic lumenaires have been previously discussed herein with reference to a number of United States patents which disclose various aspects of such lighting fixtures, the disclosures of which patents are incorporated hereinto by reference. In essence, the invention can reasonably be applied to the manufacture if parabolic louvers such as the louver 12 and such louvers as are common in the prior art as represented by the aforesaid patents inter alia.

While not expressly shown herein, the invention is adaptable also to other reflective lighting fixture components such as reflector cones and the like and particularly reflector structures which have heretofore been formed of specular anodized aluminum-such as are manufactured by Lithonia Lighting Inc. under the GOTHAM trademark inter alia. Examples of other reflector structures which would typically be manufactured with specular anodized aluminum are the reflectors disclosed in U.S. Pat. Nos. 4,475,147 and 5,363,295, the disclosures of which are incorporated hereinto by reference.

Figure 3:
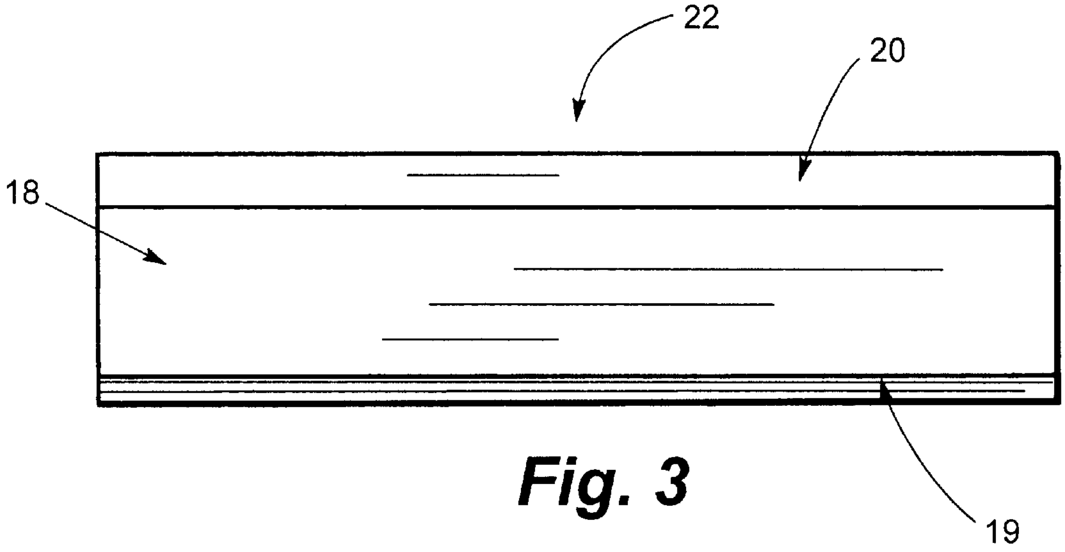
FIG. 3 is an elevational view in section of a coated substrate according to the invention.
Figure 4:
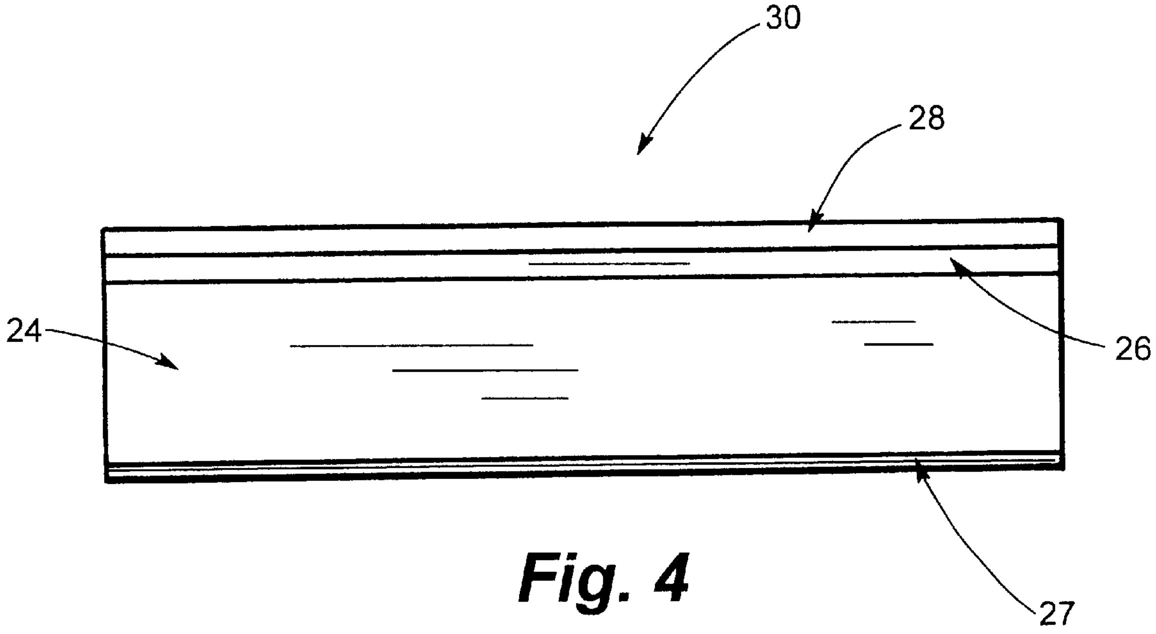
FIG. 4 is an elevation in section of a coated substrate according to the invention and having more than one coating formed on the substrate.
Figure 5:
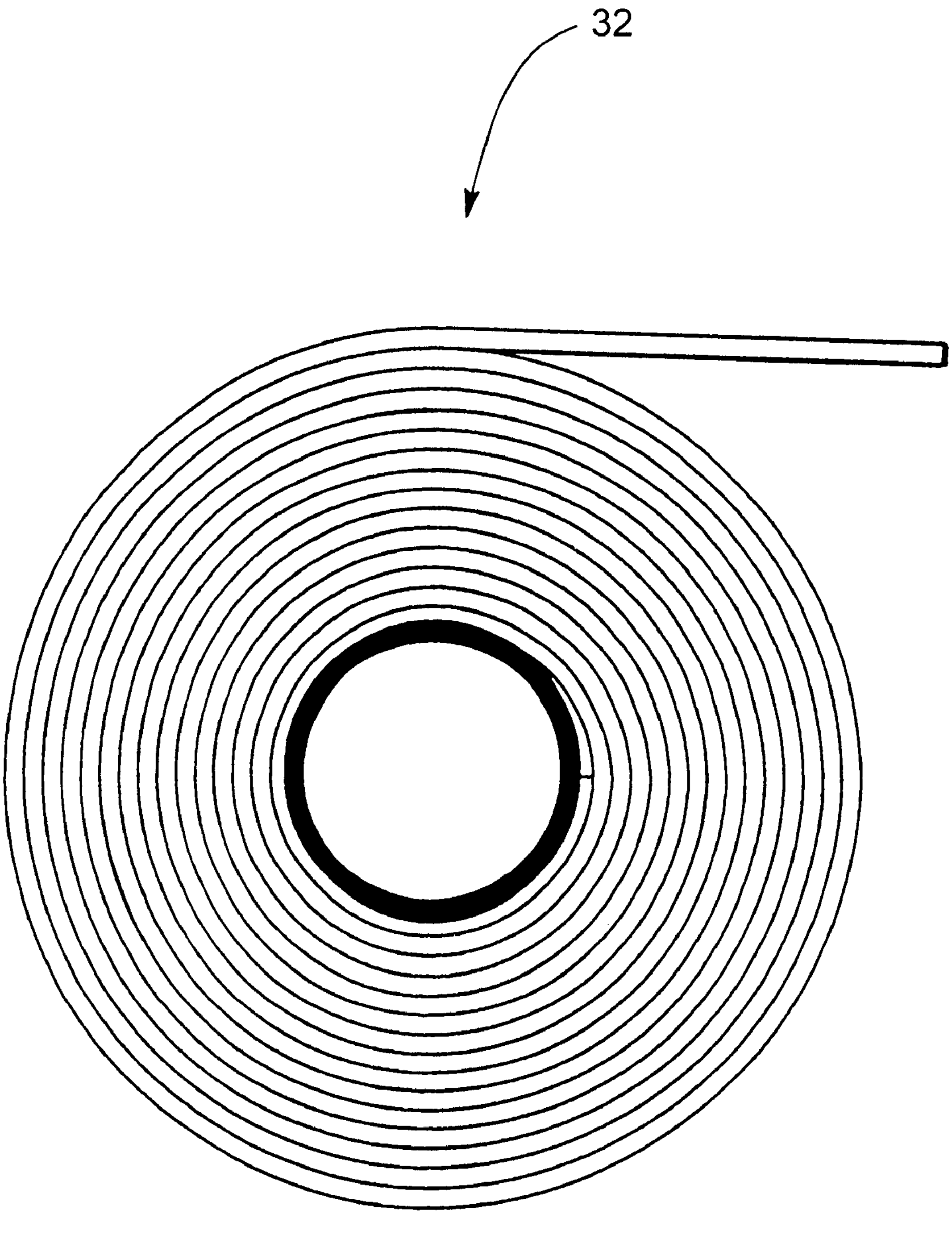
FIG. 5 is a side elevational view of a coil of light sheet material having at least one coating on both sides of the material.

Referring now to FIGS. 3, 4 and 5, the invention can be appreciated to encompass materials used in the production of respective lighting fixture components and particularly parabolic louvers such as the louver 12 as aforesaid. For simplicity to illustration the thicknesses of the various elements are not to scale. The materials of the invention comprise coated substrates such as the coated substrate 22 of FIG. 3 which is comprised of a substrate 18 having a coating 20 formed on at least one side thereof. It is to be understood that the substrate 18 could be formed with a coating 19 on the opposite planar surface thereof, the substrate 18 essentially conforming in practice to the dimensions of a sheet-like body. The coating 20 is generally thicker than the coating 19 since the coating 19 is considered to be formed on the "underside" of the substrate 18. The coating 20 can be formed of a different material than that material used to form the coating 19. The coated substrate 22 comprises a material which is inexpensive relative to those materials previously utilized to form precise optical assemblies such as the parabolic louver 12. Parabolic louvers such as is the parabolic louver 12 have previously been formed of anodized aluminum which is a highly polished aluminum anodized to provide an aluminum oxide coating on the surfaces of the material. The present materials provide performance suitable to the formation of parabolic louvers therefrom while providing a number of other substantial advantages and characteristics which cause the materials to be particularly useful in the formation of reflective lighting fixture components and even precise optical assemblies such as the parabolic louver 12.

The coated substrate 22 according to the invention can take a variety of particular forms depending upon material selection for the substrate 18 and for the coating 20. The substrate 18 can be selected from a variety of materials, the most important consideration in the selection of a substrate material being the ability of the material to either exhibit without treatment or exhibit after treatment such as through polishing and the like a total reflectance which is of as high a value as possible and above certain minimum reflectance values. A total reflectance of above 80% of such a substrate material is desirable, most candidate materials generally requiring polishing such as by mechanical polishing, electro-chemical treatment of brightening to produce the desired reflectance value. Practically, speaking, materials which cannot be caused to exhibit a total reflectance of at least 70% are considered to be unsuitable candidates for use as the substrate 18. Suitable materials typically include aluminum and alloys of aluminum which can be polished to total reflectance values and percentage ranges above the high 70 percentages. Various aluminum alloys when polished find particular utility. Anodized aluminum can also be utilized but would not normally be selected unless the material were of a quality to be inexpensive in cost yet still exhibit appropriate total reflectance values or requires the surface diffuse characteristics provided by a practice of the invention. Steel substrates are also useful according to the invention whether polished, nickel-plated, aluminized followed by polishing, electroplated or tin-plated. Steel with vacuum deposits of aluminum or the like is also useful according to the invention. Steel can be also coated by dipping or the like to form a metalized surface on the steel such is an aluminum surface. These steel-based materials can be polished, electrolytically treated either singly or doubly reduced and reflowed, chemically polished or brightened or brushed depending upon that treatment necessary to produce an acceptable total reflectance value. Aluminum substrates having a specular silver or aluminum reflective film also prove useful as do plastic substrates such as polystyrene, acrylic, etc., having vacuum metalized aluminum or silver specular deposits or coatings.

The substrate choice is primarily determined by the total reflectance value as indicated above but is also related to the ability to form the substrate into thin sheet-like bodies which retain sufficient structural integrity for forming the reflective light fixture components of the invention. The coated substrate 22 must undergo punch or tool forming operation in order to be formed into acceptable products. Accordingly, the substrate IS must be a material capable of being so formed. The material choice for the substrate 18 also involves considerations of appearance since the substrate 18 when coated with the coating 20 results in the coated substrate 22 which, at least for certain applications, desirably exhibits certain appearance And other optical qualities as will be described.

Of Particular utility is a substrate formed of a aluminum Alloy No. 3003, a designation of national standard ANSI H35, 1-1982. This aluminum alloy has a hardness of H25, an ultimate tensile strength of 25 KSI nominal with a KSI range of between 21 and 29, a yield strength of 20 KSI nominal and a KSI range of 19 to 22, and a percent elongation of 5% minimum and 10% average/nominal, elongation data being based on a 0.06" sample with elongation in 2". Aluminum alloy No. 3003 when produced on highly polished rolls results in a specular surface having a total reflectance of between 81% and 83%. The thickness of the substrate 18 is typically between 0.016" and 0.025" for the production of a parabolic louver. Thicknesses lower than 0.016" are not normally used for formation of parabolic louvers although certain applications may allow for lesser thicknesses. Thickness tolerance is typically plus or minus 0.001". Polishing operations on a substrate material such as aluminum alloy No. 3003 are conventional especially as regards mechanical polishing, the polishing operation reducing the material to achieve a surface topography of between 0 and 7 micro inches root mean square as measured on a conventional profilometer. The substrate 18 can be polished on both sides to produce the surface so specified The degree of polishing can vary with various substrate choices depending upon the operations necessary to obtain a desired total reflectance value. Production of a specular surface contributes to the total reflectance value of a given substrate material choice and minimizes visible grain structure.

Aluminum alloys having ANSI designations 1100, 5657 and 5252 also prove to exhibit exceptional utility as materials forming the substrate 18. The characteristics of these alloys are sufficiently similar for the purposes of this invention such that these alloys, as well as other aluminum alloys, are essentially interchangeable with aluminum alloy No. 3003 for us as the substrate 18. Substrate choice as between these alloys, and other substrate materials, can depend on cost considerations as much as on appearance and performance.

The substrate material so treated is coated according to the invention to produce one or more of a number of desirable characteristics. In the case of the use of aluminum alloys as aforesaid as the substrate material, the polishing operations render the surface of the alloys specular with a desirable total reflectance value. However, the surfaces of these aluminum alloy substrates are also very soft and must be protected from environmental damage such as during manufacture and handling and must also be provided with a desirable degree of wear resistance. While these mechanical functions could be provided by a variety of coatings, it is desired that the coating also provided optical functions relating to appearance, light transmission, surface reflection and the like which causes the coated substrate 22 to exhibit particular optical qualities suitable for use of the materials of the invention in the formation of reflective lighting fixture components and particularly precise optical assemblies such as parabolic louvers and the like.

In order to obtain the advantages referred to above, a coating, typically a clearcoat material such as is manufacture by Morton Coatings Inc. of Chicago, Ill. under the trade designation MOR-BRITE, is formed an one or both sides of the substrate 18 as the coating 20 and to a thickness of approximately 0.45 mils with a usual tolerance of plus or minus 0.05 mils. Available coating apparatus typically cannot consistently apply a uniform coating such as is necessary in the present situations below 0.1 mils and this value is taken as a practical lower limit for the thickness of the coating 20. Coating thicknesses above approximately 1.0 mil tend to reduce reflectivity and thus lower total reflectance values needlessly and this value is this chosen as an effective upper limit for the thickness of the coating 20. With those coatings known to be of use according to the invention, transmission losses are greatest with thicker coatings.

For use as a parabolic louver material, the coated substrate 22 of FIG. 3 preferably has a total reflectance of at least 74% with values to 70% being usable. The coating 20 is thus seen to combine with the specular surface of the substrate 18 to create a compound reflector as aforesaid to thus cause the resulting coated substrate 22 to exhibit the distribution of light aid appearance of a low iridescence, semi-specular finish such as is produced through the use of anodized aluminum as the material of choice in the prior art for production of precise optical assemblies such as parabolic louvers and the like. The particular coated substrates of the invention provide optical properties suitable for manufacture of precise optical assemblies such as parabolic louvers and exhibit a variety of advantages including the lack of visible iridescence, surface protection with minimum loss of total reflectance, suitable light control, minimized glare, uniform surface appearance, suitable total reflectance, a pleasing appearance in all directions, that is, a lack of "grain" direction with a resulting consistency of lamp imager the ability to hide fingerprints and other marks and to self-heal scratches, the ability to contain a lubricant in the coating to prevent the need for wet lubricants during punching and other forming operations and for producing optical components requiring particular cutoff angles and effective shielding of lamps. Use of the present coated substrates also results in the even illumination of the cells 14 of the parabolic louver 12 as seen in FIGS. 1 and 2. Use of aluminum alloy No. 3003 suitably coated produces a nominal total reflectance of 74%.

As is seen in FIG. 4 coated substrate 30 according to the invention comprises a substrate 24 which is substantially identical in material choice, form and function to the substrate 18 of FIG. 3. The substrate 24 is provided with a coating 26 which is essentially identical in form and function to the coating 20 of FIG. 3. Additionally, a coating 28 can be provided over the coating 26, the coating 28 preferably being taken to be an anti-reflective coating such as those coatings produced by Optical Coating Laboratory, Inc. of Santa Rosa, Calif., under the trade designation HEA. The coating 28, if an anti-reflective coating, reduces the diffuse component of the compound reflection discussed above, that is, the percentage of light diffused the surface of the coating is reduced and the surface brightness often associated with clearcoatings is lessened. The coated substrates 22 and 30 both yield quality, semi-specular photometric distribution of light suitable for manufacture of parabolic louver structures and the like the coated substrate 30 can be coated on both sides thereof with both of the coatings 26 and 28 or with a coating 27 being applied to the surfaces thereof opposite the surface of the substrate 24 having both of the coatings 26 and 28 formed thereon. The coating 27 is formed on the "underside" of the substrate and can be thinner than the coating 26 and formed of a different material if desired. The coating 28 is typically applied in a thickness less than 1 mil and is generally measured in thicknesses of angstrom units.

FIG. 5 illustrates a material formed according to the invention, that is, the coated substrate 22 as an example, in the form of a coil 32 of lighting sheet 34, the coated substrate such as the coated substrate 22 essentially forming the lighting sheet 34. The lighting sheet 34 is used in the fabrication of reflective lighting fixture components and particularly precision parabolic lumenaires and the like. Coil coating processes which Are conventional in the art can conveniently be used for the formation of the coil 32 of lighting sheet 34. The substrate which is selected is formed into a roll of sheet material which is then processed through the use of high speed machinery to clean the material such as with a standard non-etch alkaline cleaner such as 100-G Alkaline Cleaner produced by Chemical ways. Pretreatment of the roll material ie typically unnecessary on clean only bright aluminum or aluminum alloy. A selected coating material can be deposited on one or both sides of the roll material while the material is unwound at speeds up to 700' per minute. The material is then cured such as for between 20 and 40 seconds at 650° F. with a PMT of 450–465° F. A coating is typically applied according to the processes of the invention with reverse roll direction and roll setup to optimize flow and leveling. The "back side" of the material can be coated Identically as the primary surface or can be firmed with lesser amounts of materials due to the lack of the necessity for consistent film thickness and for maximum optical performance on both surfaces of the sheet material, The sheet material so processed is typically recoiled into the coil 32 for subsequent use in a manufacturing situation.

Coatings according to the invention are formed of polymeric materials such as polyesters, acrylics, acrylates, fluorocarbons, epoxies and the like and which can be described as clearcoat materials. A particular aliphatic polyester coating manufactured by Morton International, Inc. of Chicago, Ill., as will be described hereinafter, is suitable for use with the aluminum alloy No. 3003 described above to produce a coated substrate having desirable reflectance values. Polyester coatings including thermosetting polyester coatings are widely described in the art and include as an example the linear polyester coatings having high aromatic content as described in U.S. Pat. No. 4,140,729, the disclosure of which is incorporated hereinto by reference. U.S. Pat. No. 4,140,729 provides examples of coatings formed of polyester resins, an aminoplast, an acid catalyst and in organic solvent. Hard, flexible coatings are typically provided with relatively low gloss. A polyester coil coating Wing a greater degree of gloss is described in U.S. Pat. No. 4,393,121, the disclosure of which is incorporated hereinto by reference. Polyester coatings such as are described in U.S. Pat. No. 5,262,494, can also find use according to the invention, the disclosure of this patent also being incorporated hereinto by reference. Use of an alkyl acid phosphate in an aliphatic polyester coating results in production of useful polyester materials. Cycloaliphatic Polyester materials can also be usefully employed according to the invention.

Particularly suitable aliphatic polyester coatings manufactured by Morton International, Inc., of Chicago, Ill., are described hereinafter. A coating formed of this material as well as other materials suitable to the invention exhibits appearance properties such that the visible surface side of a coated substrate such as the substrate 22 is commercially smooth and free of discoloration streaks, scratches, flow lines, blisters or other imperfections which could detract from the total reflectance value of the coated substrate. Both sides of such a coated substrate should exhibit a pencil-hardness of H to 2H as measured with an EAGLE Turquoise Pencil in accordance with N.C.C.A. Technical Bulletin II-(12). The visible coating side of such a substrate must withstand 50 double rubs of methyl ethyl ketone without exposing the substrate. The underside of the coated substrate must withstand 25 double rubs with methyl ethyl ketone without exposing the substrate. Testing is performed in accordance with N.C.C.A. Technical Bulletin II-§(12).

Figure 6:
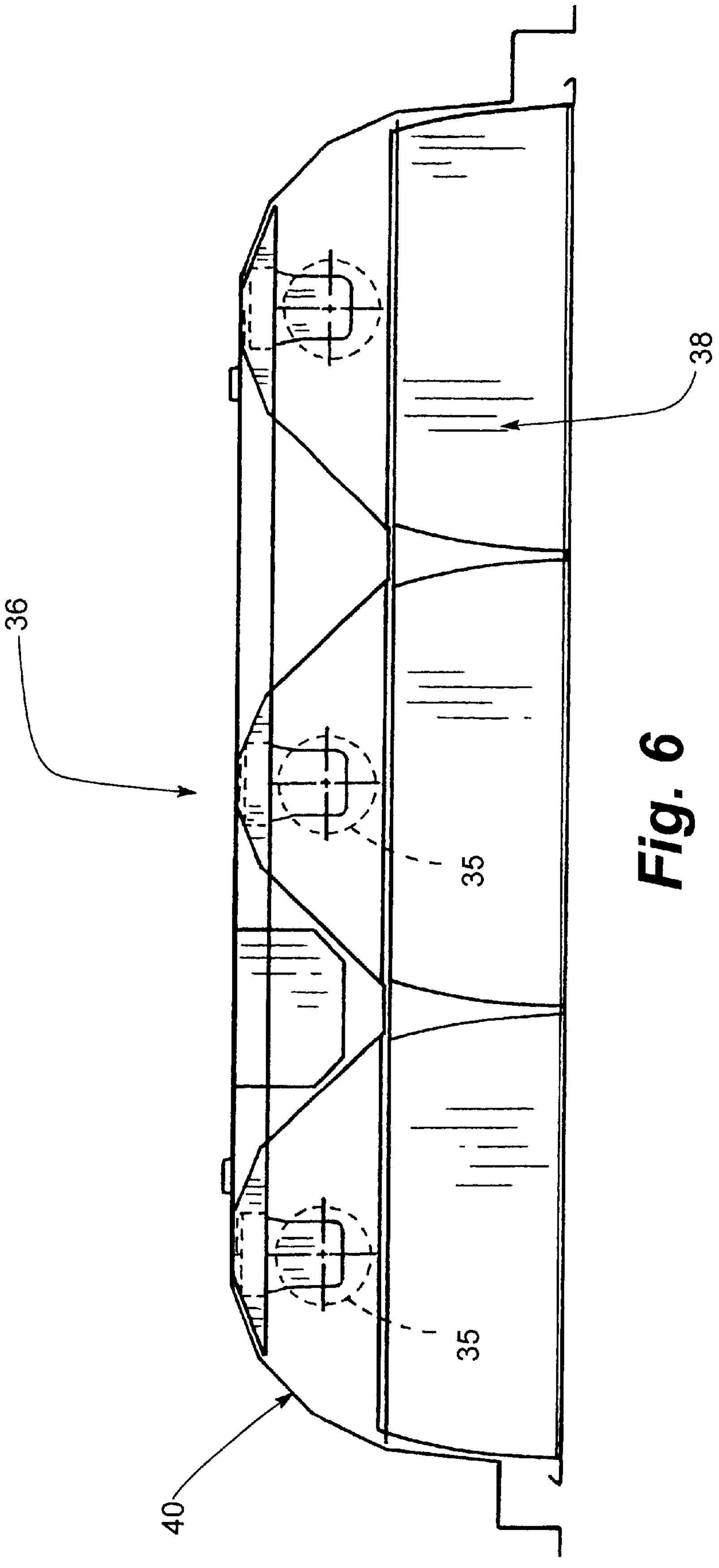
FIG. 6 is a view, illustrating the lighting fixture and louver arrangement utilized in photometric testing as is shown by data presented in FIGS. 7 and 8.

A coated substrate 22 according to the invention has particular optical properties including a gloss level of 400 at 20°, 220 to 300 at 60° and 75 to 95 at 85° as measured on a BYK Labotron Multi-Gloss glossmeter, model N4031. The distinction of image is preferably 40% to 50% as measured on ATI Systems Distinction of image Glossmeter. The total reflectance of the substrate when coated as measured on a Diano TR-1 or Technidyne TR-2 total reflectometer is 73.5% minimum with material grain and 749 minimum against material grain in the event that grain is evident. A lighting fixture such as the parabolic lumenaire 10 having the parabolic louver 12 preferably exhibits a fixture efficiency of 66% with an illuminance level averaged as 66 footcandles and an illuminance range of 61.7 to 73.3 footcandles as can be appreciated from a consideration of the polar plot of FIG. 7 with a fixture configuration as is seen in FIG. 6. FIG. 6 illustrate a parabolic lumenaire 36 comprised of a parabolic louver 38 and a housing 40 with fluorescent light sources and dimensioned as disclosed.

Suitable coatings according to the invention are those coatings selected for optical considerations to include a preferred optical transmission level and a preferred refractive index. Preferably, optical transmission level is selected at a value of 85% or greater while refractive index is selected to be less than 1.65. Most coatings such as clearcoats suitable for practice of the invention have refractive indices in the range of approximately 1.4 to 1.65. Polymeric coatings and particularly polymeric clearcoatings in virtually all of the major polymer groups have such suitable optical properties coupled with the ability to bond to or be cured to suitable substrates and which provide mechanical properties as have been noted herein as well as appearance properties also noted herein.

A fluorocarbon such as TEFLON, a product marketed by the DuPont Corporation, can be utilized in the coatings of the invention, to comprise a coating such as the coating 20 of FIG. 3. TEFLON provides a lubricating capability to the coating which facilitates manufacture. Approximately 0.5 to 1% TEFLON is utilized as a lubricant in the coating, this percentage existing prior to cure. Appearance of the coated substrates of the invention is primarily obtained by utilizing the surface reflection which occurs at the outer surface of the polymeric coating, such as the coating 20 of FIG. 3. A small percentage of the available light is reflected in a diffused manner at this interface without significant impact on overall lighting levels.

Figure 7:
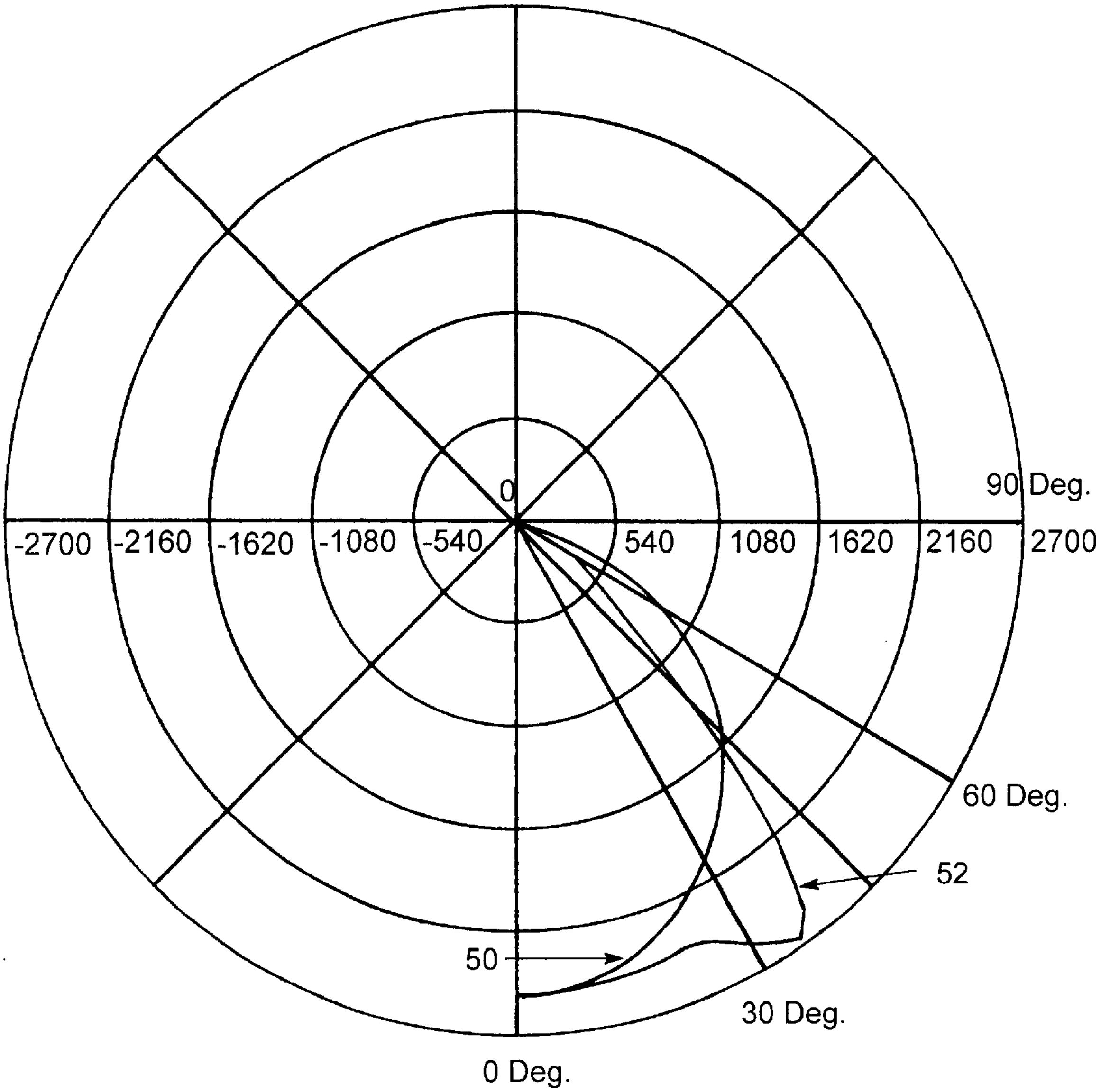
FIG. 7 is a photometric polar chart of candle-power data illustrating light distribution from the lighting fixture of FIG. 6 having a parabolic louver formed according to the invention; and, FIG. 8 is a photometric polar chart of candle-power data illustrating light distribution from the lighting fixture and parabolic louver of FIG. 6 wherein the louver is formed of another coated substrate according to the invention.
Figure 8:
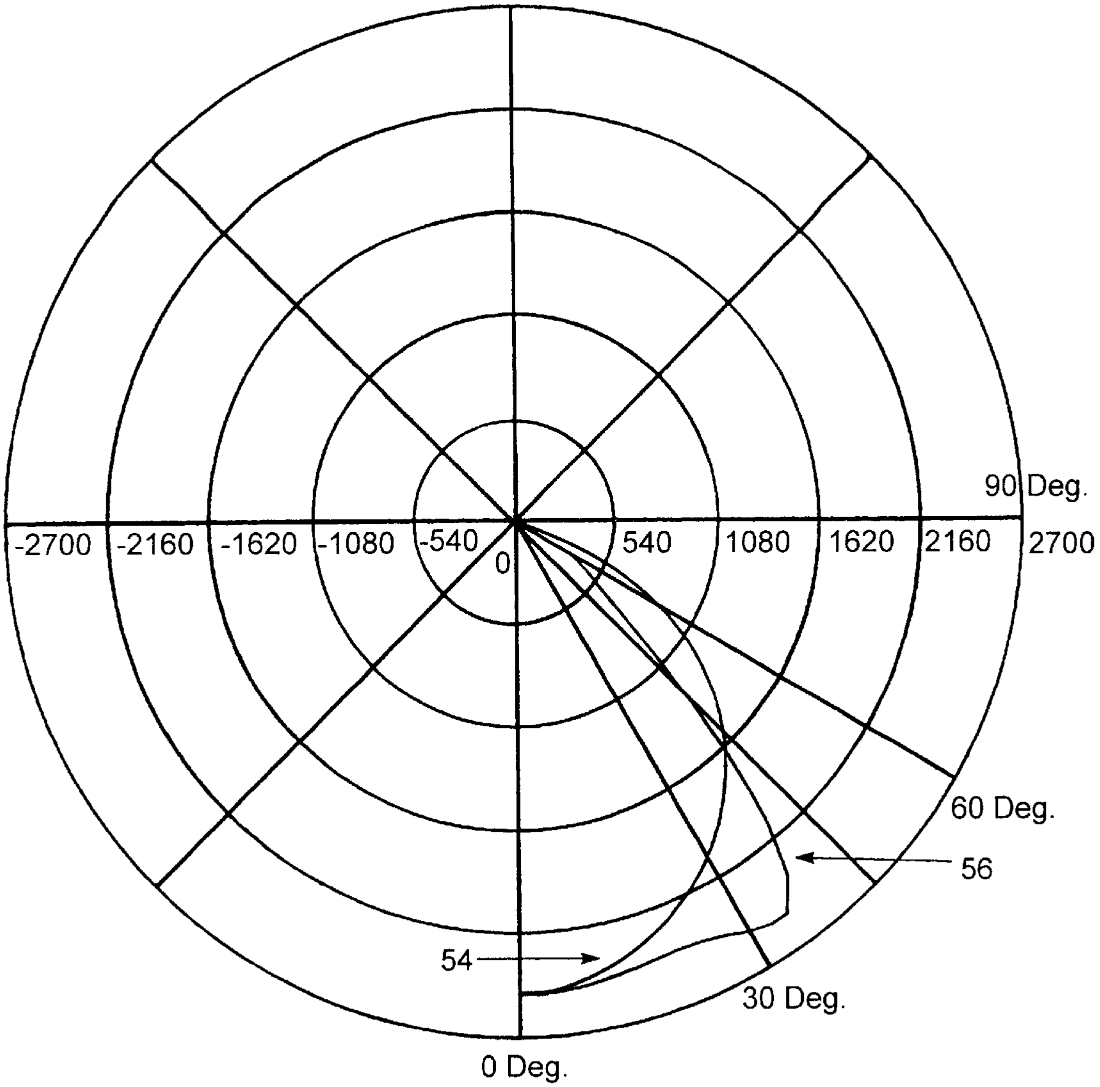

Considering again the parabolic lumenaire 36 of FIG. 6, photometric testing as represented by FIGS. 7 and 8 relate respectively to the aliphatic clearcoat material specified hereinafter, while the data for FIG. 8 relate to the same clearcoat having TEFLON included as a lubricant. The parabolic lumenaire 36 is the same for both tests. Data associated with the test represented by FIG. 7 follows:

FIXTURE NUMBER 2 PMN 3 32 18 LS (PROTOTYPE) Report No. FIG. 7
REPORT OF CANDLEPOWER DISTRIBUTION IN 5 PLANES.
LUMINAIRE PROTOTYPE TROFFER 2'× 4' 3 LAMP T8
18-CELL SPECULAR CLEAR COAT LOUVER
BALLAST 748-L-SLH-TC-P BF = .931
749-L-SLH-TC-P BF = .939
LAMPS ( 3 ) FO32/35K
REFL. .901 MOUNTING RECESSED
INPUT WATTS 107
RATED 2900 LUMENS, 2233 F.L.
SHIELDING, PARL 22 NORM 46

| | CANDLEPOWER | | | | | |
|---|---|---|---|---|---|---|
| DEG | PARL | 22.5 | 45.0 | 67.5 | NORM | OUTPUT LUMENS |
| 0 | 2501 | 2501 | 2501 | 2501 | 2501 | |
| 5 | 2495 | 2497 | 2485 | 2493 | 2495 | 238 |
| 15 | 2372 | 2382 | 2404 | 2446 | 2463 | 684 |
| 25 | 2171 | 2198 | 2275 | 2361 | 2430 | 1057 |
| 35 | 1900 | 1935 | 2144 | 2513 | 2669 | 1394 |
| 45 | 1556 | 1611 | 2009 | 1532 | 1270 | 1271 |
| 55 | 1142 | 1242 | 775 | 492 | 484 | 745 |
| 65 | 598 | 496 | 222 | 155 | 138 | 308 |
| 75 | 59 | 44 | 29 | 29 | 31 | 39 |
| 85 | 11 | 9 | 4 | 2 | 12 | 7 |
| 90 | 0 | 0 | 0 | 0 | 0 | |

| ZONAL SUMMARY | | | | AVG FL | | |
|---|---|---|---|---|---|---|
| ZONE | LUMENS | LAMP | FIXT | DEG | PARL | NORM |
| 0–30 | 1979 | 22.7 | 34.5 | 0 | 1211 | 1211 |
| 0–40 | 3373 | 38.8 | 58.7 | 45 | 1066 | 869 |
| 0–60 | 5389 | 61.9 | 93.8 | 55 | 964 | 409 |
| 0–90 | 5743 | 66.0 | 100.0 | 65 | 685 | 158 |
| 90–180 | 0 | 0.0 | 0.0 | 75 | 110 | 58 |
| 0–180 | 5743 | 66.0 | 100.0 | 85 | 59 | 64 |

LUMINAIRE SPACING CRITERION- PARL = 1.2 45 = 1.5 NORM = 1.5
CIE TYPE DIRECT LUMINOUS AREA- 44.75 L × 20.88 W
TOTAL EFFICIENCY = 66.0 PC

CANDLEPOWER DATA IN 2.5 DEGREE STEPS

| | | PLANE | | | | OUTPUT |
|---|---|---|---|---|---|---|
| ANGLE | PARALLEL | 22.5 | 45 | 67.5 | NORMAL | LUMENS |
| 0.0 | 2501 | 2501 | 2501 | 2501 | 2501 | |
| 2.5 | 2504 | 2509 | 2491 | 2493 | 2495 | |
| 5.0 | 2495 | 2497 | 2485 | 2493 | 2495 | 238 |
| 7.5 | 2473 | 2480 | 2472 | 2485 | 2488 | |
| 10.0 | 2446 | 2455 | 2458 | 2477 | 2473 | |
| 12.5 | 2411 | 2424 | 2435 | 2463 | 2470 | |
| 15.0 | 2372 | 2382 | 2404 | 2446 | 2463 | 684 |
| 17.5 | 2330 | 2341 | 2376 | 2429 | 2452 | |
| 20.0 | 2280 | 2300 | 2343 | 2415 | 2435 | |

-continued

| | | | | | | |
|---|---|---|---|---|---|---|
| 22.5 | 2224 | 2252 | 2305 | 2387 | 2415 | |
| 25.0 | 2171 | 2198 | 2275 | 2361 | 2430 | 1057 |
| 27.5 | 2107 | 2138 | 2227 | 2381 | 2489 | |
| 30.0 | 2045 | 2076 | 2180 | 2422 | 2563 | |
| 32.5 | 1972 | 2004 | 2142 | 2477 | 2622 | |
| 35.0 | 1900 | 1935 | 2144 | 2513 | 2669 | 1394 |
| 37.5 | 1815 | 1859 | 2132 | 2506 | 2544 | |
| 40.0 | 1735 | 1778 | 2130 | 2346 | 2195 | |
| 42.5 | 1645 | 1696 | 2091 | 1957 | 1726 | |
| 45.0 | 1556 | 1611 | 2009 | 1532 | 1270 | 1271 |
| 47.5 | 1461 | 1629 | 1813 | 1100 | 881 | |
| 50.0 | 1355 | 1432 | 1458 | 754 | 680 | |
| 52.5 | 1253 | 1361 | 1111 | 594 | 574 | |
| 55.0 | 1142 | 1242 | 775 | 492 | 484 | 745 |
| 57.5 | 1026 | 1105 | 541 | 411 | 406 | |
| 60.0 | 896 | 929 | 411 | 329 | 337 | |
| 62.5 | 761 | 733 | 315 | 253 | 233 | |
| 65.0 | 598 | 496 | 222 | 155 | 138 | 308 |
| 67.5 | 407 | 298 | 143 | 92 | 85 | |
| 70.0 | 161 | 134 | 87 | 53 | 57 | |
| 72.5 | 75 | 60 | 50 | 41 | 41 | |
| 75.0 | 59 | 44 | 29 | 29 | 31 | 39 |
| 77.5 | 41 | 31 | 22 | 25 | 27 | |
| 80.0 | 29 | 25 | 13 | 9 | 16 | |
| 82.5 | 18 | 12 | 4 | 7 | 7 | |
| 85.0 | 11 | 9 | 4 | 2 | 12 | 7 |
| 87.5 | 2 | 0 | 0 | 0 | 0 | |
| 90.0 | 0 | 0 | 0 | 0 | 0 | |

COEFFICIENTS OF UTILIZATION - ZONAL CAVITY METHOD
EFFECTIVE FLOOR CAVITY REFLECTANCE 0.20

| RC | 80 | | | | 70 | | | | 50 | | | 30 | | | 10 | | | 0 |
|---|---|---|---|---|---|---|---|---|---|---|---|---|---|---|---|---|---|---|
| RW | 70 | 50 | 30 | 10 | 70 | 50 | 30 | 10 | 50 | 30 | 10 | 50 | 30 | 10 | 50 | 30 | 10 | 0 |
| 0 | 79 | 79 | 79 | 79 | 77 | 77 | 77 | 77 | 73 | 73 | 73 | 70 | 70 | 70 | 67 | 67 | 67 | 66 |
| 1 | 74 | 71 | 69 | 68 | 72 | 70 | 68 | 66 | 67 | 66 | 64 | 65 | 64 | 62 | 63 | 62 | 61 | 59 |
| 2 | 69 | 65 | 61 | 59 | 67 | 64 | 61 | 58 | 61 | 59 | 57 | 59 | 57 | 55 | 58 | 56 | 54 | 53 |
| 3 | 64 | 59 | 55 | 51 | 63 | 58 | 54 | 51 | 56 | 53 | 50 | 54 | 51 | 49 | 53 | 50 | 48 | 47 |
| 4 | 59 | 53 | 48 | 45 | 58 | 52 | 48 | 44 | 51 | 47 | 44 | 49 | 46 | 43 | 48 | 45 | 43 | 42 |
| 5 | 55 | 48 | 43 | 39 | 54 | 47 | 42 | 39 | 46 | 42 | 38 | 44 | 41 | 38 | 43 | 40 | 38 | 36 |
| 6 | 51 | 43 | 38 | 34 | 50 | 43 | 38 | 34 | 41 | 37 | 34 | 40 | 37 | 34 | 39 | 36 | 33 | 32 |
| 7 | 47 | 39 | 34 | 30 | 46 | 38 | 33 | 30 | 37 | 33 | 30 | 37 | 33 | 30 | 36 | 32 | 29 | 28 |
| 8 | 43 | 35 | 30 | 26 | 42 | 35 | 30 | 26 | 34 | 29 | 26 | 33 | 29 | 26 | 32 | 28 | 26 | 25 |
| 9 | 40 | 31 | 26 | 23 | 39 | 31 | 26 | 23 | 30 | 26 | 23 | 30 | 25 | 22 | 29 | 25 | 22 | 21 |
| 10 | 37 | 28 | 23 | 20 | 36 | 28 | 23 | 20 | 27 | 23 | 20 | 27 | 23 | 20 | 26 | 22 | 20 | 19 |

IES VISUAL COMFORT PROBABILITY

RATED LUMENS PER LAMP 2900
100 FC. REFLECTANCES 80/50/20

| ROOM | | LUMINAIRES LENGTHWISE | | | | LUMINAIRES CROSSWISE | | | |
|---|---|---|---|---|---|---|---|---|---|
| W | L | 8.5 | 10.0 | 13.0 | 16.0 | 8.5 | 10.0 | 13.0 | 16.0 |
| 20 | 20 | 76 | 72 | 71 | 79 | 88 | 86 | 85 | 84 |
| 20 | 30 | 79 | 74 | 67 | 68 | 90 | 87 | 86 | 82 |
| 20 | 40 | 81 | 76 | 70 | 67 | 91 | 88 | 88 | 84 |
| 20 | 60 | 82 | 78 | 73 | 69 | 91 | 90 | 89 | 85 |
| 30 | 20 | 81 | 77 | 75 | 80 | 90 | 87 | 85 | 83 |
| 30 | 30 | 83 | 79 | 71 | 69 | 91 | 88 | 85 | 81 |
| 30 | 40 | 84 | 80 | 74 | 68 | 92 | 89 | 87 | 83 |
| 30 | 60 | 85 | 81 | 75 | 70 | 93 | 90 | 88 | 84 |
| 30 | 80 | 86 | 83 | 77 | 72 | 93 | 90 | 89 | 85 |
| 40 | 20 | 85 | 81 | 78 | 81 | 92 | 89 | 86 | 83 |
| 40 | 30 | 86 | 82 | 75 | 71 | 93 | 90 | 87 | 81 |
| 40 | 40 | 87 | 83 | 77 | 70 | 93 | 91 | 88 | 82 |
| 40 | 60 | 87 | 84 | 78 | 72 | 94 | 91 | 89 | 84 |
| 40 | 80 | 88 | 85 | 80 | 74 | 94 | 92 | 90 | 85 |
| 40 | 100 | 89 | 86 | 81 | 76 | 94 | 92 | 90 | 86 |
| 60 | 30 | 88 | 84 | 78 | 74 | 93 | 91 | 88 | 82 |
| 60 | 40 | 89 | 85 | 79 | 73 | 94 | 92 | 89 | 83 |
| 60 | 60 | 89 | 86 | 80 | 75 | 94 | 92 | 90 | 84 |
| 60 | 80 | 89 | 87 | 82 | 76 | 95 | 92 | 90 | 85 |
| 60 | 100 | 90 | 87 | 82 | 78 | 95 | 93 | 91 | 86 |
| 100 | 40 | 91 | 88 | 83 | 78 | 95 | 93 | 91 | 86 |
| 100 | 60 | 91 | 89 | 84 | 79 | 95 | 94 | 91 | 87 |

-continued

| | | | | | | | | | |
|---|---|---|---|---|---|---|---|---|---|
| 100 | 80 | 92 | 89 | 85 | 80 | 96 | 94 | 92 | 88 |
| 100 | 100 | 92 | 89 | 85 | 81 | 96 | 94 | 92 | 88 |
| | | | MRS GREATER THAN 0 | | | | | | |

Data associated with FIG. 8 is as follows:

FIXTURE NUMBER 2 PMN 3 32 18 LD (PROTOTYPE) Report No. FIG. 8
REPORT OF CANDLEPOWER DISTRIBUTION IN 5 PLANES.
LUMINAIRE PROTOTYPE TROFFER 2'× 4' 3 LAMP T8
18-CELL SEMISPECULAR CLEAR COAT LOUVER
BALLAST 748L-SLH-TC-P BF = .931
749L-SLH-TC-P BF = .939
LAMPS ( 3 ) FO32/35K
REFL. .901 MOUNTING RECESSED
INPUT WATTS 107
RATED 2900 LUMENS, 2233 F.L.
SHIELDING, PARL 22 NORM 46

| | CANDLEPOWER | | | | | |
|---|---|---|---|---|---|---|
| DEG | PARL | 22.5 | 45.0 | 67.5 | NORM | OUTPUT LUMENS |
| 0 | 2494 | 2494 | 2494 | 2494 | 2494 | |
| 5 | 2485 | 2487 | 2479 | 2482 | 2493 | 237 |
| 15 | 2356 | 2367 | 2384 | 2428 | 2450 | 679 |
| 25 | 2158 | 2183 | 2242 | 2359 | 2437 | 1051 |
| 35 | 1891 | 1915 | 2096 | 2378 | 2419 | 1350 |
| 45 | 1548 | 1592 | 1848 | 1478 | 1235 | 1222 |
| 55 | 1128 | 1159 | 775 | 496 | 483 | 726 |
| 65 | 579 | 473 | 231 | 163 | 149 | 305 |
| 75 | 64 | 54 | 39 | 36 | 31 | 47 |
| 85 | 9 | 7 | 4 | 7 | 4 | 7 |
| 90 | 0 | 0 | 0 | 0 | 0 | |

| ZONAL SUMMARY | | | | AVG FL | | |
|---|---|---|---|---|---|---|
| ZONE | LUMENS | LAMP | FIXT | DEG | PARL | NORM |
| 0–30 | 1967 | 22.6 | 35.0 | 0 | 1207 | 1207 |
| 0–40 | 3317 | 38.1 | 59.0 | 45 | 1060 | 845 |
| 0–60 | 5264 | 60.5 | 93.6 | 55 | 952 | 407 |
| 0–90 | 5623 | 64.6 | 100.0 | 65 | 663 | 170 |
| 90–180 | 0 | 0.0 | 0.0 | 75 | 120 | 58 |
| 0–180 | 5623 | 64.6 | 100.0 | 85 | 49 | 25 |

LUMINAIRE SPACING CRITERION- PARL = 1.2 45 = 1.4 NORM = 1.5
CIE TYPE DIRECT LUMINOUS AREA- 44.75 L × 20.88 W
TOTAL EFFICIENCY = 64.6 PC

CANDLEPOWER DATA IN 2.5 DEGREE STEPS

| | | PLANE | | | | OUTPUT |
|---|---|---|---|---|---|---|
| ANGLE | PARALLEL | 22.5 | 45 | 67.5 | NORMAL | LUMENS |
| 0.0 | 2494 | 2494 | 2494 | 2494 | 2494 | |
| 2.5 | 2497 | 2500 | 2493 | 2489 | 2491 | |
| 5.0 | 2485 | 2487 | 2479 | 2482 | 2493 | 237 |
| 7.5 | 2462 | 2468 | 2461 | 2477 | 2480 | |
| 10.0 | 2428 | 2435 | 2439 | 2467 | 2472 | |
| 12.5 | 2393 | 2406 | 2415 | 2446 | 2461 | |
| 15.0 | 2356 | 2367 | 2384 | 2428 | 2450 | 679 |
| 17.5 | 2315 | 2333 | 2348 | 2411 | 2437 | |
| 20.0 | 2263 | 2284 | 2315 | 2394 | 2428 | |
| 22.5 | 2211 | 2237 | 2281 | 2372 | 2428 | |
| 25.0 | 2158 | 2183 | 2242 | 2359 | 2437 | 1051 |
| 27.5 | 2096 | 2114 | 2200 | 2355 | 2463 | |
| 30.0 | 2031 | 2055 | 2163 | 2373 | 2500 | |
| 32.5 | 1960 | 1985 | 2128 | 2385 | 2521 | |
| 35.0 | 1891 | 1915 | 2096 | 2378 | 2519 | 1350 |
| 37.5 | 1811 | 1842 | 2068 | 2335 | 2383 | |
| 40.0 | 1726 | 1773 | 2026 | 2176 | 2072 | |
| 42.5 | 1636 | 1676 | 1954 | 1857 | 1652 | |
| 45.0 | 1548 | 1592 | 1848 | 1478 | 1235 | 1222 |
| 47.5 | 1452 | 1500 | 1670 | 1099 | 894 | |
| 50.0 | 1345 | 1396 | 1378 | 790 | 690 | |
| 52.5 | 1244 | 1287 | 1076 | 609 | 579 | |
| 55.0 | 1128 | 1159 | 775 | 496 | 483 | 726 |

-continued

| | | | | | | |
|---|---|---|---|---|---|---|
| 57.5 | 1013 | 1024 | 561 | 409 | 407 | |
| 60.0 | 879 | 850 | 416 | 330 | 329 | |
| 62.5 | 740 | 672 | 317 | 253 | 231 | |
| 65.0 | 579 | 473 | 231 | 163 | 149 | 305 |
| 67.5 | 398 | 294 | 155 | 110 | 99 | |
| 70.0 | 203 | 155 | 102 | 75 | 70 | |
| 72.5 | 101 | 78 | 61 | 50 | 46 | |
| 75.0 | 64 | 54 | 39 | 36 | 31 | 47 |
| 77.5 | 45 | 37 | 22 | 27 | 27 | |
| 80.0 | 34 | 25 | 18 | 16 | 25 | |
| 82.5 | 22 | 13 | 13 | 7 | 13 | |
| 85.0 | 9 | 7 | 4 | 7 | 4 | 7 |
| 87.5 | 2 | 4 | 0 | 0 | 0 | |
| 90.0 | 0 | 0 | 0 | 0 | 0 | |

COEFFICIENTS OF UTILIZATION - ZONAL CAVITY METHOD
EFFECTIVE FLOOR CAVITY REFLECTANCE 0.20

| RC | 80 | | | | 70 | | | | 50 | | | 30 | | | 10 | | | 0 |
|---|---|---|---|---|---|---|---|---|---|---|---|---|---|---|---|---|---|---|
| RW | 70 | 50 | 30 | 10 | 70 | 50 | 30 | 10 | 50 | 30 | 10 | 50 | 30 | 10 | 50 | 30 | 10 | 0 |
| 0 | 77 | 77 | 77 | 77 | 75 | 75 | 75 | 75 | 72 | 72 | 72 | 69 | 69 | 69 | 66 | 66 | 66 | 65 |
| 1 | 72 | 70 | 68 | 66 | 71 | 69 | 67 | 65 | 66 | 64 | 63 | 63 | 62 | 61 | 61 | 60 | 59 | 58 |
| 2 | 67 | 63 | 60 | 57 | 66 | 62 | 59 | 57 | 60 | 58 | 55 | 58 | 56 | 54 | 56 | 55 | 53 | 52 |
| 3 | 63 | 57 | 53 | 50 | 61 | 57 | 53 | 50 | 55 | 51 | 49 | 53 | 50 | 48 | 52 | 49 | 47 | 46 |
| 4 | 58 | 52 | 47 | 44 | 57 | 51 | 47 | 44 | 50 | 46 | 43 | 48 | 45 | 42 | 47 | 44 | 42 | 41 |
| 5 | 54 | 47 | 42 | 38 | 53 | 46 | 41 | 38 | 45 | 41 | 38 | 44 | 40 | 37 | 42 | 39 | 37 | 36 |
| 6 | 50 | 42 | 37 | 34 | 49 | 42 | 37 | 34 | 41 | 36 | 33 | 40 | 36 | 33 | 39 | 35 | 33 | 32 |
| 7 | 46 | 38 | 33 | 30 | 45 | 38 | 33 | 29 | 37 | 32 | 29 | 36 | 32 | 29 | 35 | 32 | 29 | 28 |
| 8 | 42 | 34 | 29 | 26 | 41 | 34 | 29 | 26 | 33 | 29 | 26 | 32 | 28 | 25 | 32 | 28 | 25 | 24 |
| 9 | 39 | 31 | 26 | 22 | 38 | 30 | 26 | 22 | 30 | 25 | 22 | 29 | 25 | 22 | 28 | 25 | 22 | 21 |
| 10 | 36 | 28 | 23 | 20 | 35 | 28 | 23 | 20 | 27 | 23 | 20 | 26 | 22 | 20 | 26 | 22 | 19 | 18 |

IES VISUAL COMFORT PROBABILITY

RATED LUMENS PER LAMP 2900
100 FC. REFLECTANCES 80/50/20

| ROOM | | LUMINAIRES LENGTHWISE | | | | LUMINAIRES CROSSWISE | | | |
|---|---|---|---|---|---|---|---|---|---|
| W | L | 8.5 | 10.0 | 13.0 | 16.0 | 8.5 | 10.0 | 13.0 | 16.0 |
| 20 | 20 | 76 | 72 | 72 | 80 | 88 | 86 | 86 | 85 |
| 20 | 30 | 78 | 74 | 68 | 69 | 89 | 87 | 86 | 83 |
| 20 | 40 | 80 | 76 | 71 | 67 | 90 | 88 | 87 | 83 |
| 20 | 60 | 81 | 78 | 73 | 70 | 90 | 89 | 88 | 85 |
| 30 | 20 | 81 | 77 | 76 | 80 | 90 | 87 | 85 | 84 |
| 30 | 30 | 82 | 78 | 71 | 70 | 90 | 87 | 85 | 82 |
| 30 | 40 | 83 | 80 | 73 | 68 | 91 | 88 | 86 | 82 |
| 30 | 60 | 84 | 81 | 75 | 70 | 91 | 89 | 87 | 84 |
| 30 | 80 | 85 | 82 | 76 | 72 | 91 | 89 | 88 | 85 |
| 40 | 20 | 82 | 80 | 79 | 82 | 91 | 88 | 86 | 84 |
| 40 | 30 | 84 | 81 | 75 | 72 | 91 | 89 | 86 | 81 |
| 40 | 40 | 85 | 82 | 76 | 70 | 92 | 89 | 87 | 82 |
| 40 | 60 | 86 | 83 | 78 | 72 | 92 | 90 | 88 | 83 |
| 40 | 80 | 87 | 84 | 79 | 74 | 92 | 90 | 88 | 84 |
| 40 | 100 | 87 | 85 | 80 | 75 | 92 | 90 | 89 | 85 |
| 60 | 30 | 84 | 82 | 77 | 75 | 91 | 90 | 87 | 82 |
| 60 | 40 | 86 | 83 | 78 | 73 | 92 | 90 | 88 | 82 |
| 60 | 60 | 87 | 84 | 79 | 74 | 92 | 91 | 88 | 83 |
| 60 | 80 | 88 | 85 | 80 | 76 | 93 | 91 | 89 | 84 |
| 60 | 100 | 88 | 86 | 81 | 77 | 93 | 91 | 90 | 85 |
| 100 | 40 | 86 | 83 | 79 | 75 | 92 | 90 | 89 | 84 |
| 100 | 60 | 87 | 84 | 81 | 76 | 92 | 91 | 89 | 85 |
| 100 | 80 | 88 | 85 | 82 | 78 | 93 | 91 | 90 | 86 |
| 100 | 100 | 88 | 86 | 83 | 79 | 93 | 91 | 90 | 86 |

As seen in FIG. 7, curve 50 represents light emanating from the lumenaire 36 in a direction parallel to the orientation of the longitudinal axes of lamps 55. Curve 52 having a "bat wing" shape represents light emanating from the lumenaire 36 in a direction perpendicular to the orientation of the longitudinal axes of the lamps 35. In FIG. 8 curve 54 represents-light emanating from the lumenaire 36 in a direction parallel to the orientation of the longitudinal axes of lamps 35. Curve 56 having a "bat wing" shape represents is light emanating from the lumenaire 36 in a direction perpendicular to the orientation of the longitudinal axes of the lamps 35.

Particular benefits accruing through use of the present coated substrates include appearance values as set out in detail herein, a particular appearance value being that the diffuse appearances of the present materials occur without a diffuse light distribution, thereby causing the present materials to have exceptional use for formation of reflective lighting fixture components including parabolic louvers. Surface reflection according to the invention also can be controlled by-variation of the refractive index of the coating 20 of the coated substrate 22 of FIG. 3 as an example. Surface reflection is thereby controlled in order to achieve a variation in surface appearance for differing product applications and appearance values. The use of an anti-reflective coating as previously described can also be provided for this purpose.

According to particular embodiments of the invention which produce the photometric results of FIGS. 7 and 8, the substrate 18 to be coated is cleaned with a cool solution of an alkaline cleaner such as is known in the art under the trademark and product number PARKER 338 and PARKER 1089, then rinsed thoroughly and blown dry.

One of the aluminum alloys referred to above is used as the substrate 10. Using the materials to be described, pretreatment and priming are not necessary. Curing occurs according to the discussion which follows.

A coating such as the coating 20 of FIG. 3 is provided by a coil coating composition comprising a hydroxy functional resin an aminoplast curing agent, a sulfonic acid, and an acid phosphate. The resin may be a polyester or an acrylic polymer. The hydroxy-functional resins useful in the coating composition of this-invention have a hydroxyl number of from about 10 to about 90. Mixtures of said resins have an average hydroxyl number of from about 30 to about 50. The polyesters are made by the condensation of polyhydric alcohols and polycarboxylic acids. Examples of suitable polyhydric alcohols include di-, tri-, and tetra-hydric compounds such as ethylene glycol, 1,3-propylene glycol, 1,4-butylene glycol, 1,6-hexanediol, diethylene glycol, triethylene glycol, neo-pentyl glycol, 1,4-cyclohexanediol, 2,2,4-trimethyl-1,3-pentanediol, 1,4-cyclohexanedimethanol, trimethylol ethane, trimethylol propane, pentaerythritol and dipentaerythritol. Mixtures of two or more of the polyhydric compounds may be used. Adipic, methyladipic malonic sebacic, suberic, glutamic, fumaric, itaconic a malic, diglycolic, the 1,3- and 1,4-cyclohexane-dicarboxylic acids, pimelic, azelaic, 1,12-dodecanedioic, maleic acid, maleic anhydride, succinic and tetrapropenyl succinic acids and their anhydrides, and tetrahydrophthalio anhydride exemplify the saturated aliphatic acids and anhydrides from which the polyesters may be derived. Mixtures of two or more of the polycarboxylic acids may be used. Examples of aromatic polycarboxylic acids which may be used in place of or in combination with the aliphatic acids include isophthalic acid, terephthalic acid, phthalic anhydride, benzophenone dicarboxylic acid, diphenic acid, 4,4-dicarboxydiphenyl ether, and trimellitic acid, and the like.

Polycondensation of the reactants is effected by heating the reactants to a temperature in the range of from 100° C. to 250° C. with the aid of inert gas sparging, a vacuum or both. The reaction is continued until the acid number is reduced to the lowest practical value consistent with the desired molecular weight, preferably to about 10 or lower. The rate of the condensation reaction may be increased by the use of conventional catalysts such as butyl stannoic acid, p-toluenesulfonic acid, dinonylnaphthalene sulfonic acid and the like.

Hydroxyl-functional polyesters suitable for formulating the coatings are available commercially. Examples of said polyesters include the POLYMAC 935 resin marketed by McWhorter, Inc. and prepared by the condensation of isophthalic acid and adipic acid with 2,2-dimethyl-1,3-propanediol to give a hydroxyl number of about 40–50 (100% solids). Other polyester resins suitable for use in this invention are the SCD 1060 and SCD 16602 marketed by Etna Products, Inc., Cargill's 66-6613 resin, CHEMPOL 11-3369resin by Cook Composites and Polymers, and the AROPLAZ 6025-Z-70 resin by Reichhold which is believed to be the product of the condensation of a 67:33 by weight mixture of isophthalic acid and adipic acid with a molar excess of propylene glycol to give an OH value of about 62 (70% solids). Examples of other suitable polyesters include the highly cycloaliphatic polyesters described in U.S. Pat. No. 5,262,494 referred to above. An aliphatic polyester made from a reaction mixture comprising, by weight, from about 35 to about 42% of a mixture of an aliphatic diol and a cycloaliphatic diol, from about 3 to about 10% of an aliphatic triol, and from about 54 to about 55% of a mixture of a cycloaliphatic dicarboxylic acid and a cycloaliphatic acid anhydride and having a hydroxyl number of 35–45 is preferred. More preferably, the triol content is from about 3 to about 5%.

Mixtures of two, three, four, or more polyesters are suitable given compatibility of each polyester with the others with which it is mixed.

The acrylic resin is obtained by polymerizing a suitable combination of a hydroxyl-functional group-containing acrylic or methacrylic monomer and-another co-polymerizable monomer or a conventional manner wherein the polymerization temperature is from 60° C. to 100° C. and the time is from 3 to 10 hours. Examples of hydroxyl group-containing monomers include hydroxyethyl acrylate, hydroxypropyl acrylate, the corresponding methacrylates, and mixtures of two or more of such monomers. Examples of co-polymerizable monomers include aromatic monomers such as styrene, vinyltoluene, and a-methylstyrene, esters of acrylic and/or methacrylic acid with alcohols having from 1 to 6 carbon atoms such as ethylacrylate propylmethacrylate, ethyl-hexylacrylate, and cyclohexylmethacrylate.

In general, the polyester-based clearcoating composition comprises:

(A) from about 20% to 80% by weigh a of at least one hydroxy-functional polyester having a hydroxyl number of from about 10 to about 90;

(B) from about 2 to about 20% of an aminoplast curing agent;

(C) from about 0.05% to about 2% of a sulfonic acid catalyst;

(D) from about 0.01% to about 0.25% of an acid phosphate ester;

(E) from 0 to about 5% of a lubricant; and, (F) from 0 to about 5% of a flatting agent, The aminoplast curing agents are oligomers that are the reaction products of aldehydes particularly formaldehyde, with amino- or amido-group-carrying substances exemplified by melamine, urea, dicyanodiamide, and benzoguanamine. It is preferable to employ aminoplasts such as hexamethylol melamine, dimetholol urea, and their etherified forms, i.e., modified with alkanols having from one to four carbon atoms. Hexamethoxymethyl melamine, and tetramethoxy glycoluril exemplify said etherified forms. Thus, a wide variety of commercially available aminoplasts can be used for combining with the polyesters described herein. Aminoplast crosslinking agents are sold by American Cyanamid under the trademark CYMEL. The RESIMENE alkylated melamine-formaldehyde resins are useful. Of course, it is possible to use mixtures of all of the above N-methylol products.

Acidic catalysts may be used to modify the curing of the polyester with an aminoplast resin by lowering the required temperature or raising the reaction rate or both. From about 0.05 to about 2% of a sulfonic acid such as p-toluenesulfonic acid, a dinonylnaphthalene sulfonic acid, and an acid phosphate may be used for this purpose. The residual acid group(s) of the acid phosphate attach to the-metal surface and prepare it for adhesion by the cured resin. The phosphate is a mono- or di-ester of phosphoric acid and an aliphatic alcohol or a phenol. It is exemplified by ethyl di-acid phosphate, diethyl acid phosphate, butyl di-acid phosphate, dibutyl acid phosphate, and phenyl di-acid phosphate. The mono ester is present in a dilute solution of phosphoric acid (e.g., about 10% by weight) in the corresponding alcohol or phenol. From about 0.06 to about 0.08% of a mono ester is suitable when coatings containing highly cycloaliphatic polyesters are cured in contact with a metal surface.

The so-catalyzed curing of the coating containing a hydroxyl-functional resin with aminoplast takes place in about 10 minutes at a peak metal temperature of about 380° F. (about 190° C. ) but it is preferable to cure the coating in 20 seconds at a peak metal temperature of 450° F. in a 650° F. oven.

The addition of from about 0.05 to about 5%, by weight, of an organic surface-treated silica having a particle size of from about 1 to about 7 microns as a flatting agent causes the light reflected from a bright aluminum substrate to be diffuse rather than specular and does not significantly interfere with the reflectivity of the coated metal. A low melting, high molecular weight solid such as a wax is a suitable surface treating material for the silica particles A Wax may be a hydrocarbon or an ester of a fatty acid and a fatty alcohol. Beeswax, carnauba, paraffin, polyolefins, and polyol ethers are examples of waxes which may serve as a surface treatment for the silica. Platting agent OK 412 is an example of a wax treated silica. It has a refractive index of 1.45. A flatting agent having a lower refractive index would also be suitable.

An internal lubricant is desirable in a coating composition for a metal panel to aid in the stamping of three-dimensional articles from the coated substrate such as the substrate 22, Polytetrafluoroethylene (PTFE) powder having a particle size of from about 0.01 to about 30 microns ($\mu$) to is a preferred lubricant because of the exceptionally low coefficient of friction which it imparts to the coated substrates. A mixture of polyethylene (PE) and PTFE wherein the PTFE content may be as low as 1% by weight of the mixture is suitable. A powder sold by Micropowders, Inc. under the trademark POLYFLUO 523 XF is such a mixture wherein the PE/PTFE ratio is 3:1, the maximum particle size is 10$\mu$, and the mean size is about 5$\mu$. A PE/PTFE mixture is preferred because of its easy dispersibility in the resin even though the PE's contribution to the lubricity of the composition is negligible in comparison with that of the PTFE. The amount of PTFE, whether alone or in admixture with PE, may be from about 0.01 to about 1.5% by weight of the, total composition.

A minor amount of an acrylic oligomer may be used as a flow aid in the composition.

The resins, curing agent, acid phosphate flatting agent, and optional additives such as the lubricant and flow aid are formed into a clearcoating by mixing them with from about 5 to about 35% of one or more organic solvents based on the total weight of the coating composition. The solvent system generally will be a mixture of aliphatic and aromatic solvents. Examples of the aliphatic solvents include butanol, 2-ethylhexanol, the dibasic esters available from DuPont under the designation DBE. These esters are refined dimethyl esters of adipic glutamic, and succinic acids. A DBE may comprise from 10 to 25% dimethyl adipate, 55 to 75% dimethyl glutarate, and 15 to 25% by weight of dimethyl succinate.

The Coatings so described may be applied to the selected substrates of the invention by spraying, roller coating, or by the coil coating process.

A coating composition having the formulation shown in the following table was We by mixing a non-crystalline aromatic polyester (Polyester A) and a highly crosslinked polyester (Polyester B) with the other ingredients listed in the following table and filtering the mixture.

| Component | Parts by Weight |
|---|---|
| Polyester A* | 40.50 |
| Polyester B** | 27.00 |
| DBE solvent | 16.20 |
| n-Butanol | 2.70 |
| 2-Ethylhexanol | 2.70 |
| RESIMENE 747 curing agent | 7.02 |
| Acrylic flow aid | 0.27 |
| NACURE 1051 catalyst | 0.34 |
| Ethyl acid phosphate (10% in ethanol) | 0.27 |
| Aromatic S-100 solvent | 1.35 |
| POLYFLUO 523 XF lubricant | 0.55 |
| OK-412 flatting agent | 1.10 |

*hexanediol/2,2,4-trimethylpentanediol/trimethylolpropane/isophthalic acid/terephthalic acid; OH No. 30–35(NV); 60% NV
**neopentyl glycol/trimethylolethane/isophthalic acid/phthalic anhydride/adipic acid; OH No. 42–46(NV); 60% NV A 0.45 mil thick layer of the coating composition was applied to a 3003 aluminum substrate by a hand held roller and baked in a 650° F. oven for 20 seconds to achieve a peak metal temperature of about 450° F. The coated substrate was then placed under a lamp at various angles of incidence with the grain and across the grain. Reflectance readings taken at each position and depth of reflective image (DOI) readings are compared with those for anodized-aluminum substrates in the following table.

| | Reflectance with grain/across grain Substrate | |
|---|---|---|
| Angle | Anodized | Bright aluminum |
| 20° | 0.0/0.0 | 0.0/0.0 |
| 60° | 362.2/343.7 | 302.7/284.6 |
| 85° | 101.3/99.5 | 92.7/93.8 |
| Total | 83.2/83.2 | 74.8/75.1 |
| DOI | 48/46 | 43/42 |

Compositions as described in U.S. Pat. No. 5,262,494 referred to herein and identified by the trademark MORBRITE by Morton International, Inc., are applied to an aluminum substrate and baked to a PMT of about 450° F. for 20 seconds to obtain a 0.45 mil thick coat on the substrate. The reflectance of the coated substrate was measured at various angles of incidence with the grain and across the grain with model 4031 GYK Labotron Multi-Gloss glossmeter. Depth of image (DOI) readings taken with a Model 1792 portable Distinctness of Image meter sold by ATI Systems, Inc. are compared with those for anodized aluminum panels in the following table. The total reflectance was measured by a Diano TR-1 or a Technidyne TR-2 total reflectometer made by Technidyne Corporation. Reflectance depth of image readings are compared with those for anodized aluminum panels in the following table.

| | Reflectance with grain/across grain Substrate | |
|---|---|---|
| Angle | Anodized | Bright aluminum |
| 20° | 0.0/0.0 | 0.0/0.0 |
| 60° | 362.2/343.7 | 307.3./357.6 |
| 85° | 101.3/99.5 | 98.3/91.2 |
| Total | 83.2/83.2 | 74.0/73.8 |
| DOI | 48/46 | 47/49 |

Suitable coatings useful as the coating 20 inter alia can comprise polyurethanes and ureas as well as clear-coatings described in the following U.S. patents which are incorporated hereinto by reference:

| | | |
|---|---|---|
| 3,882,189 | 4,533,703 | 5,178,915 |
| 3,962,522 | 4,734,467 | 5,244,696 |
| 4,229,555 | 5,043,220 | 5,252,404 |
| 4,393,121 | 5,084,304 | 5,356,669 |
| 4,520,188 | 5,100,732 | 5,376,460 |
| 4,530,976 | 5,141,818 | |

Certain of these patents as well as U.S. Pat. No. 4,103,050 describe details of clearcoating processes. U.S. Pat. No. 4,103,050 is also incorporated hereinto by reference.

The use of an anti-static material in the coating such as the coating 20 of the coated substrate 22 of FIG. 3 can be utilized with appropriate grounding of a parabolic louver by hinging and latching to prevent static build-up, thereby minimizing formation of dust particulates on blades of the louver. Anti-static coatings can be applied over said coating 20 if selected to minimize optical and mechanical properties. Antistatic additives would be selected for producing the anti-static property while minimizing transmission losses to provide acceptable arrestance characteristics.

Further characteristics of the coated substrates produced according to the invention include an image clarity of between 35 and 80 as measured on a Dorigon D-47 Glossmeter manufactured by Hunter Laboratories. Still further, a specular reflectance of between 8 and 20 is typically exhibited by the coated substrates of the invention as measured by a Dorigon D-47 Glossmeter manufactured by Hunter Laboratories. The same glossmeter is also used to measure diffuseness of the coated substrates, this measurement being between 0.10 and 0.50.

While the invention has been described in terms of particular examples, it is to be understood that the invention can be practiced according to the teachings thereof without departure from the intended scope and spirit of the invention as recited in the appended claims.

What is claimed is:

1. A method for producing a diffuse, non-iridescent surface appearance on reflective surfaces of a parabolic louver formed of an aluminum alloy, the louver forming major reflective surfaces of a parabolic lighting fixture, comprising:

polishing the aluminum alloy to yield a total reflectance of at least 70%;

coating the polished surface of the aluminum alloy with a polymeric clearcoat composition to yield a finished surface having a total reflectance of at least 70% and a non-iridescent, diffuse surface finish; and, forming the coated alloy into reflective components of the assembled louver.

2. The method of claim 1, wherein the aluminum alloy is selected from the group consisting of aluminum alloys No. 3003, 1100, 5657 and 5252.

3. A method for forming lighting sheet having a diffuse, non-iridescent finish on reflective surfaces thereof, the lighting sheet being formable into louver structures forming major reflective surfaces of parabolic lighting fixtures, comprising:

polishing a metal substrate to yield a total reflectance of at least 70%; and, coating the polished surface of the metal substrate with a polymeric clearcoat composition to yield a finished surface having a total reflectance of at least 70% and a non-iridescent, diffuse surface finish.

4. The method of claim 3 wherein the substrate is formed of a material selected from the group consisting of aluminum and alloys of aluminum.

5. The method of claim 3 wherein the material from which the substrate is formed is selected from the group consisting of aluminum, alloys of aluminum, polished steel, plated steel, aluminized steel post polished, steel coated with a reflective film, aluminum coated with a reflective film and plastic coated with a reflective film.

6. The method of claim 3 wherein the substrate comprises polished aluminum alloy No. 3003 having a total reflectance of approximately 81 to 83%.

7. The method of claim 6 wherein the coating is an aliphatic polyester clearcoat.

* * * * *